US006736924B1

(12) United States Patent
Janssen, Jr. et al.

(10) Patent No.: US 6,736,924 B1
(45) Date of Patent: May 18, 2004

(54) FOLDER ASSEMBLY MACHINE

(75) Inventors: Alexander Patton Janssen, Jr., Charlottesville, VA (US); Samuel Aston Loyd, Jr., Waynesboro, VA (US); Timothy Lee Worley, Barboursville, VA (US)

(73) Assignee: VAS of Virginia, Inc., Charlottesville, VA (US)

( * ) Notice: Subject to any disclaimer, the term of this patent is extended or adjusted under 35 U.S.C. 154(b) by 0 days.

(21) Appl. No.: 09/705,214

(22) Filed: Nov. 2, 2000

Related U.S. Application Data

(60) Provisional application No. 60/163,143, filed on Nov. 2, 1999.

(51) Int. Cl.[7] .......................... B32B 31/00; B32B 31/16

(52) U.S. Cl. ....................... 156/297; 156/303; 156/221; 156/256; 156/539; 493/947; 493/393

(58) Field of Search ................................ 156/548, 458, 156/303, 297, 216, 226, 221, 265, 264, 483, 256, 492, 505, 506, 539; 493/947, 393, 394; 281/29, 49

(56) References Cited

U.S. PATENT DOCUMENTS

| | | |
|---|---|---|
| 2,138,788 A | 11/1938 | Hart et al. |
| 2,970,634 A | 2/1961 | Hantscho |
| 3,260,516 A | 7/1966 | Blair |
| 4,557,715 A | 12/1985 | Robinson |
| 4,586,917 A | 5/1986 | Robinson |
| 4,764,240 A | 8/1988 | Simeone, Sr. et al. |
| 4,779,897 A | 10/1988 | Schall et al. |
| 4,973,298 A | 11/1990 | Ferguson |
| 5,069,738 A | 12/1991 | Ruemeli et al. |
| 5,292,300 A | 3/1994 | Bluemle |
| 5,433,692 A | 7/1995 | Gutowski |
| 5,439,436 A | 8/1995 | Moll |

*Primary Examiner*—Sue A. Purvis
(74) *Attorney, Agent, or Firm*—Richard D. Multer

(57) ABSTRACT

Apparatus and methods for manufacturing a folder which has front and back panels with a divider therebetween. The divider front and back panels and divider are taped together along a spine of the folder such that the panels and divider can be turned like the pages of a book. There may be one, two, or three or possibly even more dividers with all of the dividers being secured in place at the spine of the folder.

The tape(s) may be pleated so that the panel-to-divider and/or divider-to-divider compartments can expand. This pleating technique can also be employed to give expansibility to the single compartment of a file folder which does have internal dividers.

2 Claims, 20 Drawing Sheets

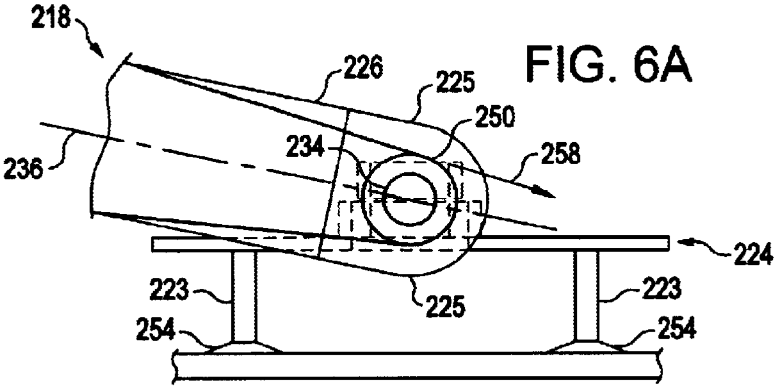
FIG. 6A
FIG. 6
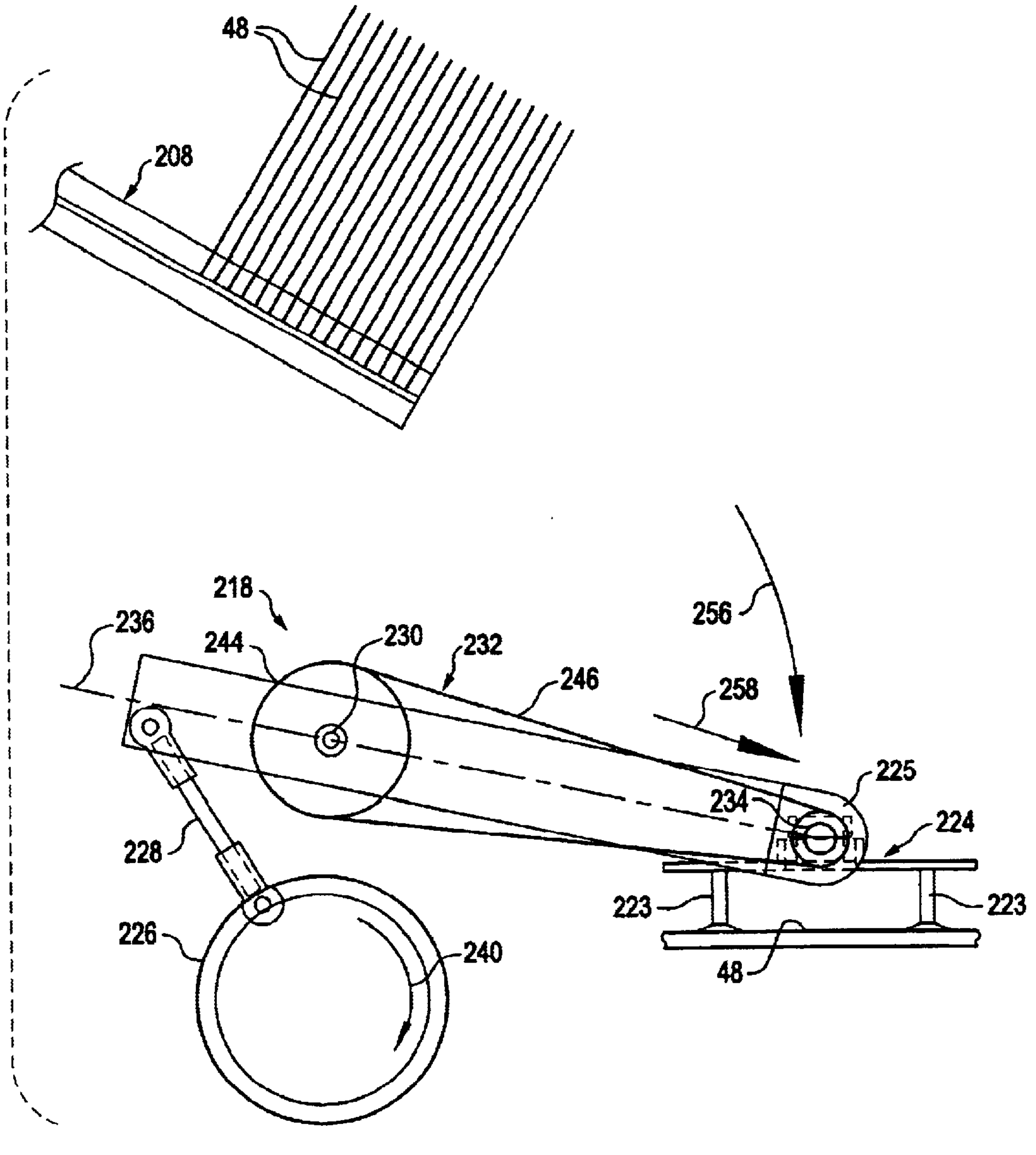

FOLDER ASSEMBLY MACHINE

REFERENCE TO A RELATED APPLICATION

This application is related to provisional application No. 60/163,143 filed Nov. 2, 1999. The benefit of the filing date of the provisional application is claimed.

TECHNICAL FIELD OF THE INVENTION

The present invention relates to novel, improved methods and apparatus for installing dividers in file folders and to the folders produced by that method and apparatus.

BACKGROUND OF THE INVENTION

File folders having a front panel and a back panel and a flexible tape hinge extending the length of the folder are used in very large numbers. Often, the hinge of the folder will be pleated so the folder can be expanded. Dividers are many times installed between the front and back panels of the folder so that the material filed in the folder can be separated into different compartments for the convenience of one using that material.

A machine for taping the front and back panels of a folder together to form a hinge is disclosed in U.S. Pat. No. 4,764,240 issued Aug. 16, 1988 to Simeone for APPARATUS AND METHOD FOR AUTOMATICALLY FORMING UNITARY BONDED BOARD STRUCTURES. However, there is to date no machinery which automates the process of taping the dividers between the front and back folder panels.

SUMMARY OF THE INVENTION

Now invented, and disclosed herein, are certain new and novel apparatus and methods which can be used to secure dividers between front and rear folder panels. The dividers are held in place by tape segments extending along the spine of the folder. These tapes are flexible, forming a hinge and allowing the front panel and dividers to be turned like the pages of a book.

In this novel apparatus and process, a previously made feedstock folder having front and back panels joined by a hinge tape is fed with the folder open and the panels in the same plane to a station where a divider is moved into position on one panel of the feedstock folder. Next, the divider is taped in place by a flexible tape extending the length of the folder spine. The divider is then flipped (or rotated) toward the other folder panel to expose the second side of the divider. A second tape is then applied to secure the divider in place in the feedstock folder.

In a subsequent step, the divider securing tape and the hinge tape may be crimped or creased to form pleats which allow the folder to be expanded to accommodate a lesser or greater volume of material.

Subsequent dividers can be installed in much the same manner as the first divider with subsequent dividers being moved into position relative to the feedstock folder with its previously installed divider(s) and then taped in place.

It will be appreciated that the loading of feedstock folders at the upstream end of a machine employing the principles of the invention, the removal of completed folders from the downstream end of the machine, and perhaps other steps such as the placing of dividers at the taping stations, can be performed manually, if one wishes. Such machines are to be understood as being within the purview of the present invention.

The objects, features, and advantages of the invention will be apparent to the reader from the foregoing and the appended claims and as the ensuing detailed description and discussion of the invention proceeds in conjunction with the accompanying drawings.

BRIEF DESCRIPTION OF THE DRAWINGS

in FIG. 5 the transfer mechanism is shown as it appears when plucking a divider from the feed hopper;

FIG. 6 is a view similar to FIG. 5 but with the transfer mechanism having advanced and placed the divider on the feedstock folder;

FIG. 6A is a fragment of FIG. 6, drawn to an enlarged scale to show, with more clarity, details of the FIGS. 5 and 6 divider transfer mechanism;

FIG. 8 is taken along line 8—8 of FIG. 7;

FIG. 9 is taken along line 9—9 of FIG. 7;

FIG. 11A is a fragment of FIG. 11, drawn to an enlarged scale to show a feature of the present invention which is important in at least the maintenance of the FIG. 2 machine;

FIG. 28 shows the feedstock folder after one internal divider has been taped to the rear panel of the feedstock folder and to the folder panel-to-folder panel hinge tape;

FIG. 29 shows the internal divider flipped over (or rotated) to expose its untaped side;

FIG. 30 shows a second divider placed and positioned on the front panel of the feedstock folder;

FIG. 31 shows the folder assemblage with one side of the second divider taped to the exposed side of the first divider and to the hinge tape;

FIG. 32 shows the assemblage with the second divider flipped over to expose the untaped side of that divider; and FIG. 33 shows the assemblage with the second divider taped to the front cover panel and to the hinge tape;

DETAILED DESCRIPTION OF THE INVENTION

Figure 1:
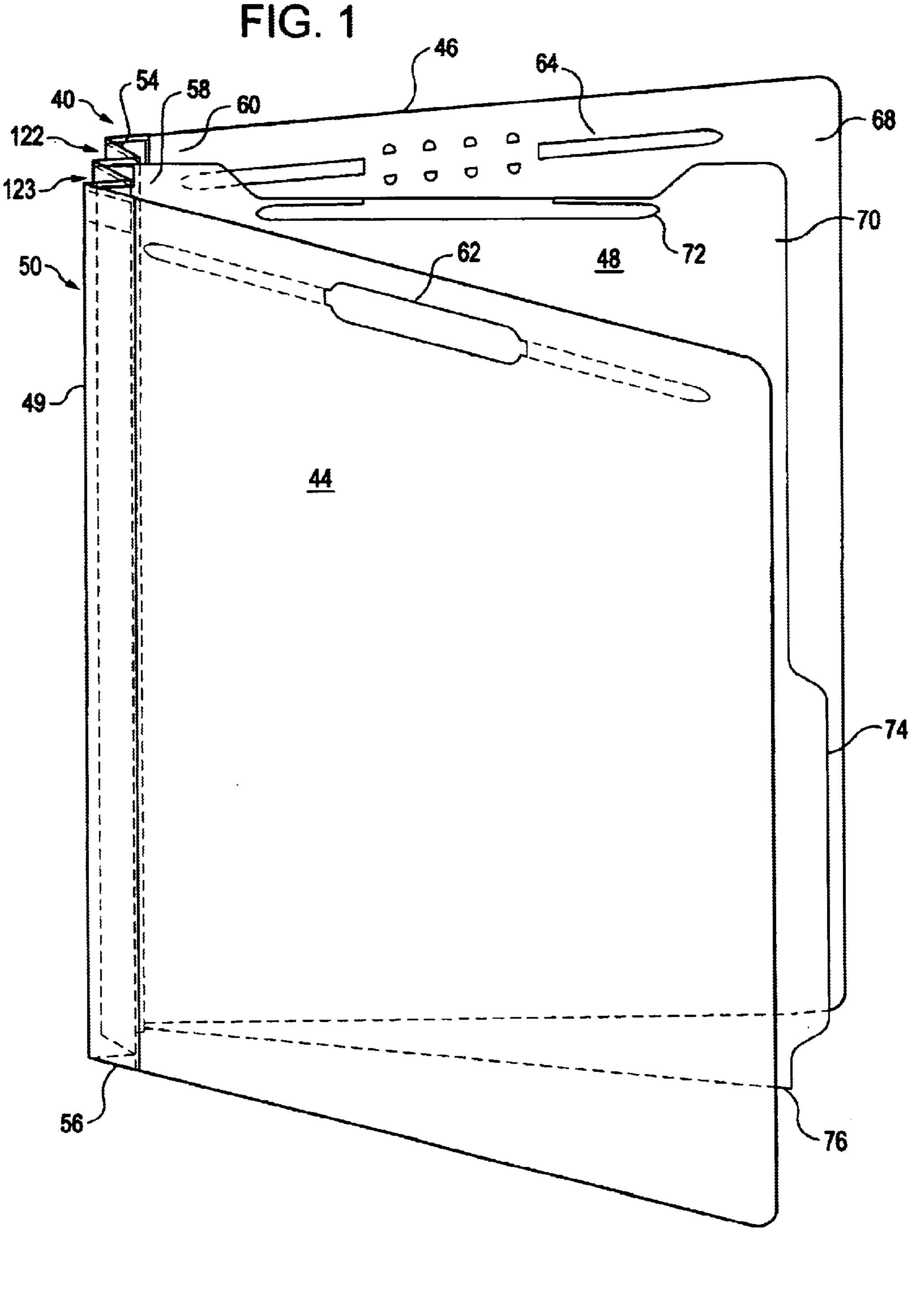
FIG. 1 is a pictorial view of a representative classification folder which has one internal divider; this classification folder embodies and is constructed in accord with the principles of the present invention.

The principles of the present invention will be developed primarily by reference to the manufacture of folders with a single internal divider in the interest of brevity and clarify. A folder of that character is identified by reference character 40 in FIG. 1, and a machine for manufacturing the single divider folder is illustrated in FIG. 2 and identified by reference character 42.

CLASSIFICATION FOLDER

Figure 2:
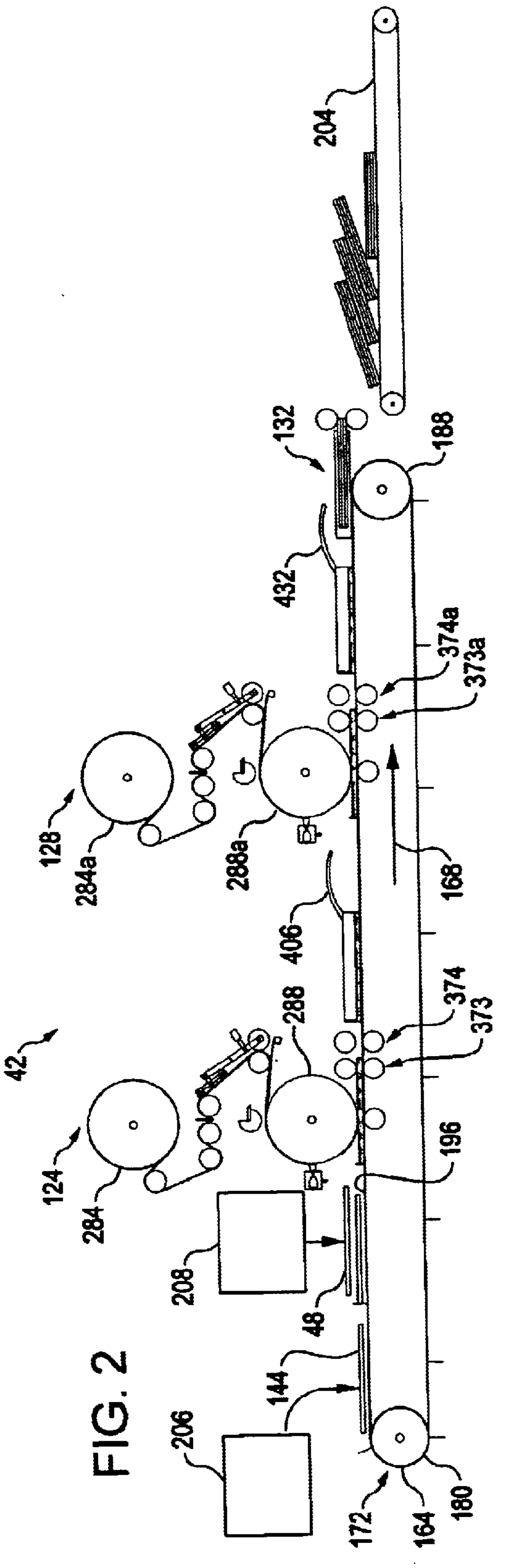
FIG. 2 is a generally schematic side view of a machine for manufacturing the representative FIG. 1 classification folder; this machine and the process it carries out embody the principles of the present invention.

Referring first to FIG. 1, folder 40 has front and back panels (or covers) 44 and 46 and an internal divider 48. At the left-hand margin 49 of the folder, the front and back panels 44 and 46 and the divider 48 are as joined together by a pleated hinge 50 which extends from the top 54 to the bottom 56 of the folder. Hinge 50: (a) allows the folder panels 44 and 46 and the divider 48 to be manipulated in the same manner as the pages of a book; and (b) permits the folder to be expanded to increase the storage space in the compartment 58 between folder panel 44 and internal divider 48 and/or the storage space in the compartment 60 between divider 48 and folder panel 46.

Folder 40 also has clips 62 and 64 at the top 54 of the folder and on the inner sides 66 and 68 of folder panels 44 and 46 for securing material in place in folder compartments 58 and 60. Clips are also installed at the top 54 of folder 40 and on both sides of divider 48 for the same purpose. One of these clips—the clip installed on front side 70 of the divider—is shown in FIG. 1 and identified by reference character 72.

Another feature of the representative folder 40 shown in FIG. 1 are a side tab 74 on divider 48 and a bottom tab 76 on back folder panel 46. These tabs can be labeled to facilitate the identification of the material in folder storage compartments 58 and 60.

FOLDER ASSEMBLY MACHINE

Figure 8:
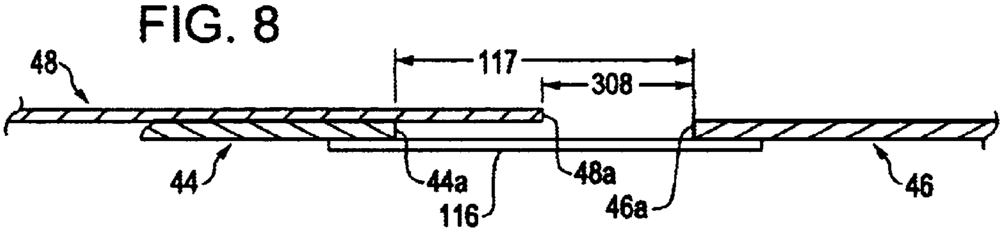
FIG. 8 is a section through the feedstock folder—divider—tape assemblage as that assemblage passes through the FIG. 4 taping station.

As discussed above, the front and back panels 44 and 46 and divider 48 of folder 40 are held together by a pleated hinge 50 at the left-hand margin 49 of the folder (as oriented in FIG. 1). Hinge 50 is composed of three, flexible (typically TYVEK), tapes 116, 118, and 120. A flexible tape 116 joins together in spaced apart relationship with a gap 117 therebetween the front and back panels 44 and 46 of folder 40. A second flexible tape 118 joins divider 48 to front panel folder 44 (see FIG. 9), and a third flexible tape 120 bonds the divider to rear folder panel 46. The fixing of divider 48 in place in the illustrated orientation relative to front and back folder panels 44 and 46 with the divider inner edge **48*a* midway between the apposite, inner edges 44*a* and 46*a* of front and rear folder panels 44 and 46 (FIG. 8) with tapes 118 and 120 is accomplished with the above-mentioned machine 42. Machine 42 also forms pleats 122 and 123 in: (a) tapes 116/118 and (b) tapes 116/120 so that the storage compartments 58 and 60** can be expanded.

As shown in FIG. 2, machine 42 has: (a) a first taping station 124 for applying and bonding in place the tape 118 which bonds divider 48 to folder front panel 44; (b) a second taping station 128 where the tape 120 bonding the divider to the back panel 46 of folder 40 is applied; and (c) a pleating section 132 for forming the pleat 122 in the tapes 116 and 118 between folder front panel 44 and divider 48 and the second pleat 123 in the tapes 116 and 120 between the divider and the back panel 46 of folder 40.

Figure 3:
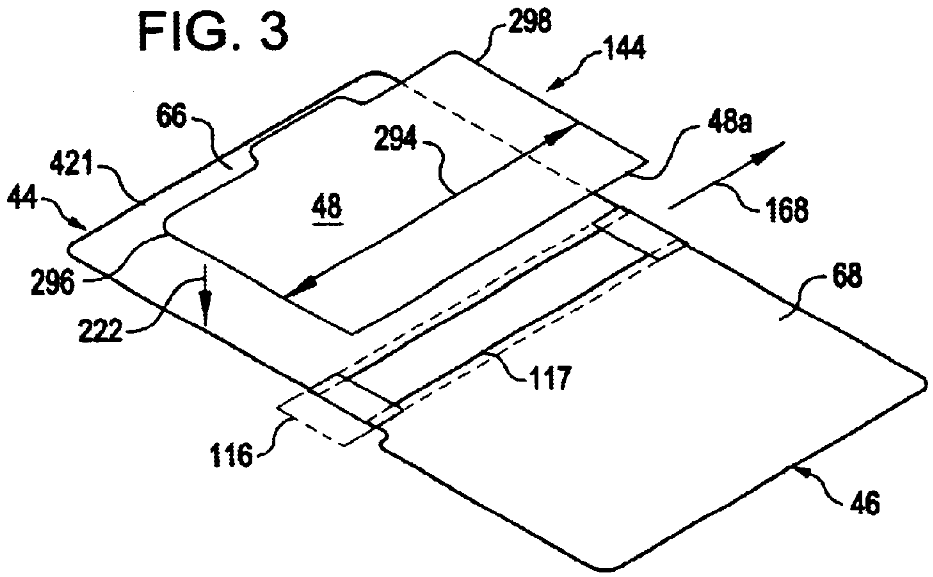
FIG. 3 is a pictorial view of an initial step in the manufacture of the FIG. 1 folder; in this step a divider is fed to the FIG. 2 machine and aligned on the front panel of a feedstock folder which has spaced apart front and back panels joined by a hinge tape; the hinge tape extends from the top to the bottom of the feedstock folder.
Figure 9:
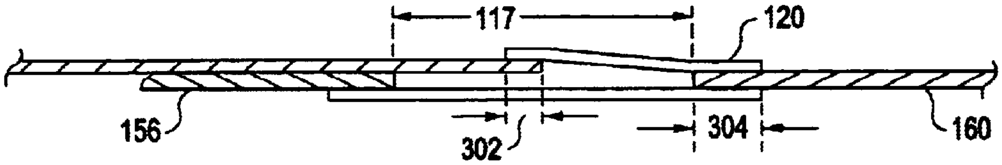
FIG. 9 is a view similar to FIG. 8 but showing the divider and feedstock folder after the tape segment has been applied to those components in the FIG. 4 taping station.

The feedstock for machine 42, shown in FIG. 3, is a dividerless "feedstock" folder 144 made up of the above-discussed front panel 44 and rear panel 46 joined together in spaced apart relationship by tape 116. This tape extends from the top 54 to the bottom 56 edges of the feedstock folder on what, as shown in FIG. 9, are the outer sides 156 and 160 of the folder front and back panels 44 and 46. Tape 116 is folded up and over the top 54 and bottom 56 edges of the folder (see FIG. 3) and bonded to the inner sides 66 and 68 of folder panels 44 and 46 to reinforce the bonds between the tape 116 and the folder panels 44 and 46.

The feedstock folders 144 may be assembled by hand or by machine. One suitable machine is that disclosed in the above-cited and discussed U.S. Pat. No. 4,764,240.

The feedstock folders 144 are moved from the upstream end 164 of folder assembly machine 42 seriatim through taping station 124, taping station 128, and pleating section 132 in the direction indicated by arrow 168 in FIG. 2. Employed for this purpose is a conveyor 172 which has endless belts (or chains) **176*a–d* trained around upstream and downstream rolls 180 and 188 at opposite ends of machine 42. A set 190 of cleats 192 extending transversely across conveyor 172 engages the trailing edge 194 of each feedstock folder 144 delivered to machine 42. These cleats, as shown in more detail in FIG. 4, move the feedstock folder first through the taping stations 124 and 128 and then through the pleating section 132 of machine 42 as the upper runs of belts 176*a–d* move in the direction indicated by arrow 168 in FIG. 4 along the path indicated by reference character 220**.

The feedstock folders 144 are housed in a supply unit 206 and may be placed on conveyor 172 by hand or by an automated delivery system of conventional character (not shown as it is not part of the present invention). At the downstream end 188 of machine 42, the finished folders 40 may be removed by hand or fed onto a transfer conveyor 204 for delivery to an automatic packager (not shown), for example.

Dividers 48 are placed on the front panel 44 of each feedstock folder 144 in the orientation and at the position relative to the front and back feedstock folder panels shown in FIG. 3 at a location between the upstream end 164 of folder assembly machine 42 and the first taping station 124. In the machine 42 depicted diagrammatically in FIG. 2, the dividers 48 are plucked from a hopper 208 and placed on the feedstock folder panels 44 by the vacuum transfer mechanism shown in FIGS. 5 and 6 and identified by reference character 218.

Figure 4:
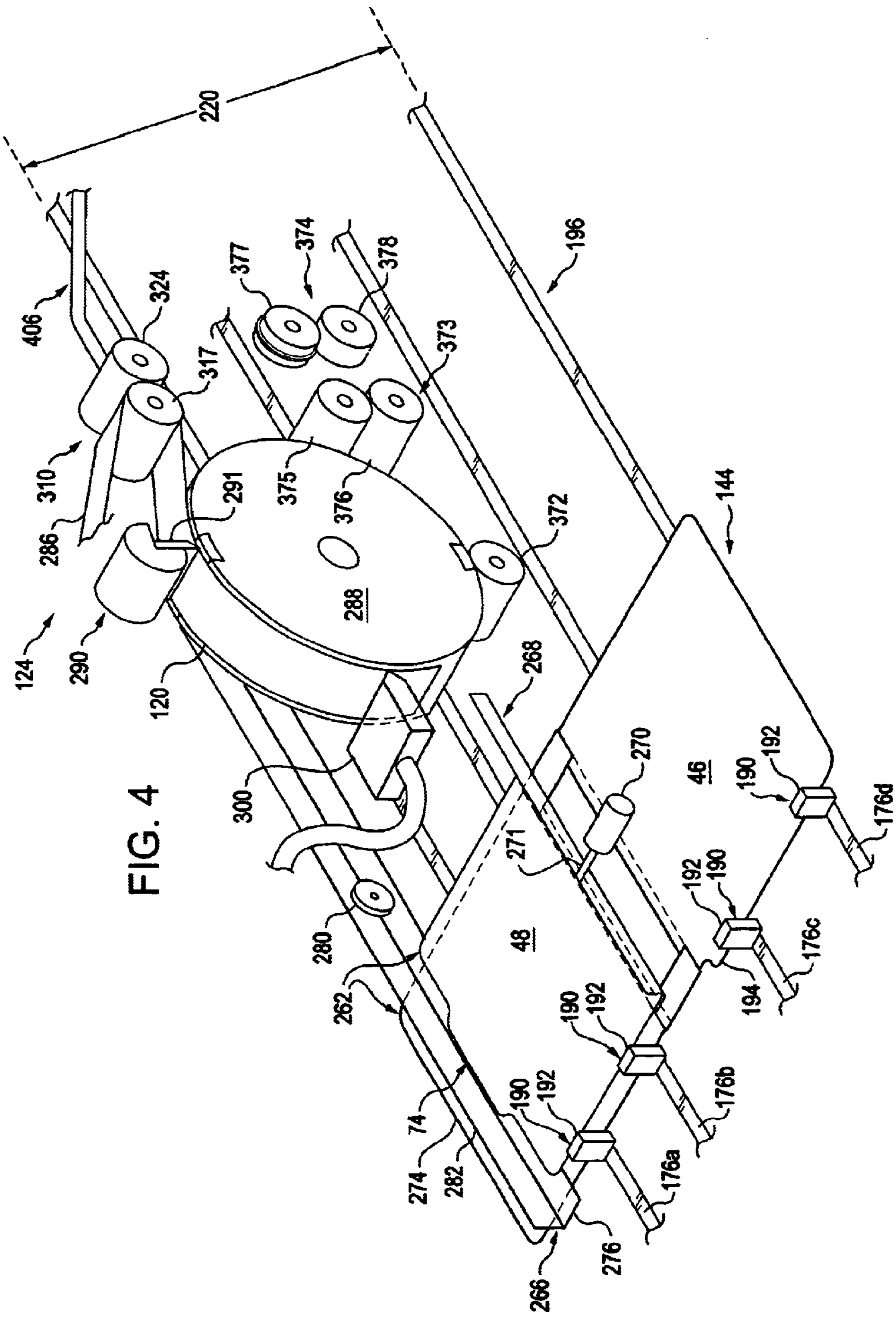
FIG. 4 is a fragmentary view of the FIG. 2 machine; shown in FIG. 4 is: (a) mechanism for aligning the divider relative to the feedstock folder; (b) a conveyor which advances folder components to and through the stations of the FIG. 2 machine; and (c) a first taping station where one side of the divider is taped to the back panel of the feedstock folder with a segment of tape which overlies, and is also bonded to, the feedstock folder hinge tape.

Referring now most particularly to FIGS. 2–6, feedstock folders 144 are pushed by cleats 192 from near the upstream end of conveyor 172 defined by roll 180 along path 220 in the "open" configuration shown in FIG. 4 in which the front and back folder panels 44 and 46 lie flat and in spaced apart, side-by-side relationship on the timing belts **176*a–d* of conveyor 172. As a feedstock folder 144 reaches the location of divider hopper 208, a divider 48 is plucked from that tray-like hopper and placed on the front folder panel 44 as suggested by arrow 222 in FIG. 3**.

The vacuum transfer mechanism 218 employed to effect this transfer of divider panels from hopper 208 to feedstock folder 144 is of a commercially available type, and, by itself, is not part of the present invention. Accordingly, that mechanism has been shown, and will be described, only to the extent necessary for a clear understanding of the present invention.

Figure 5:
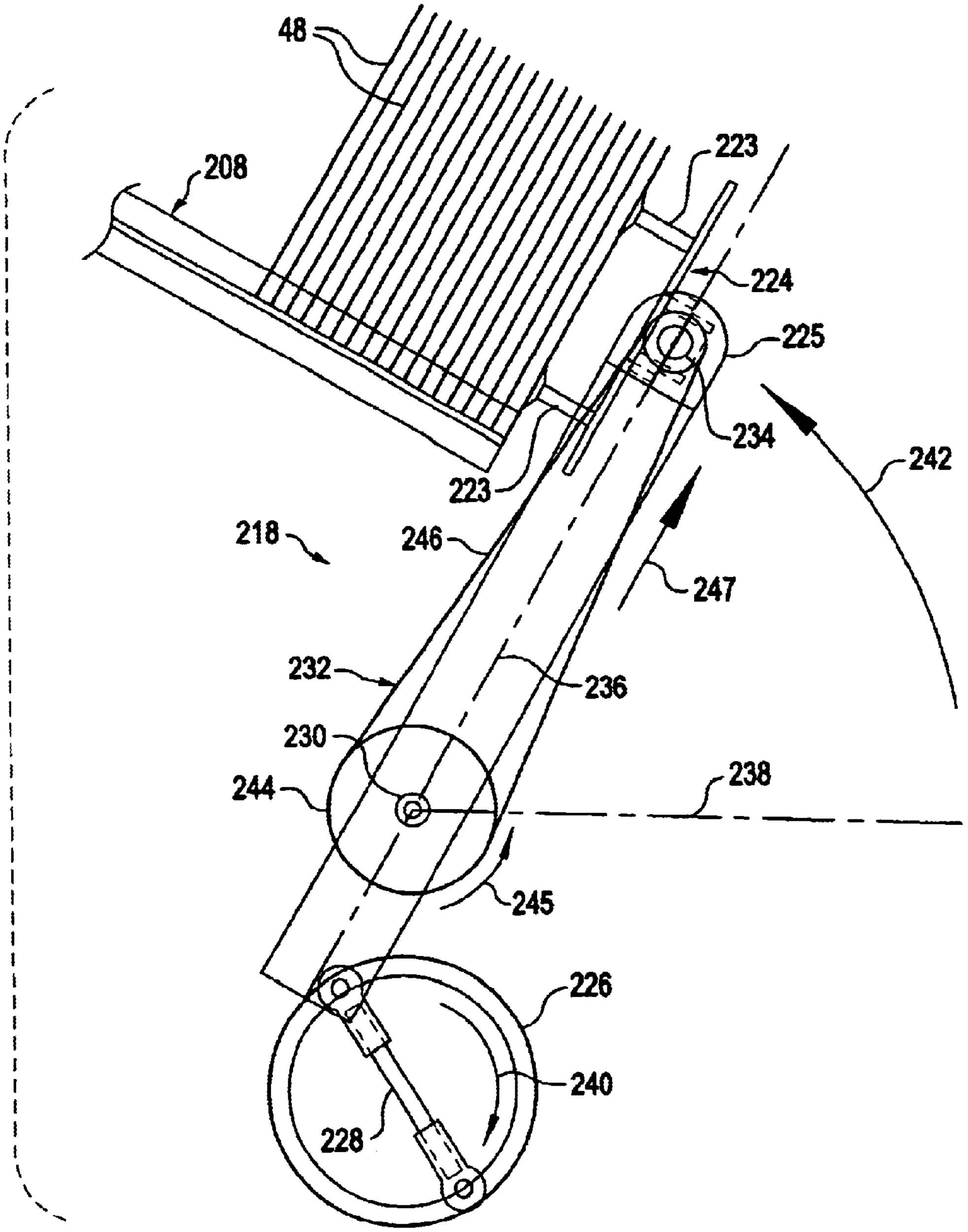
FIG. 5 is a side view of a transfer mechanism which is located upstream from the first taping station and which plucks dividers from a feed hopper and places those dividers on the feedstock folder as shown in FIG. 3.

Referring then specifically to FIGS. 5 and 6, transfer mechanism 218 includes: huff and puff type pickups 223; a carriage 224 for the pickups; a pivotably mounted carriage arm 225; a crank 226 and connecting rod 228 for rotating arm 225 about a stationary axle 230; and a chain and sprocket mechanism 232 for rotating vacuum pickup carriage 224 about an axle 234.

Vacuum transfer mechanism 218 is initialized in a rest position (not shown) in which the longitudinal centerline 236 of arm 225 passing through the rotation axes of axles 230 and 234 coincides with line 238. With arm 225 in this "at rest" position, crank 226 is rotated in the clockwise direction indicated by arrow 240 in FIGS. 5 and 6 to start the divider transfer cycle. This results in carriage support arm 225 rotating upwardly with axle 230 in the counterclockwise direction indicated by arrow 242 to the position shown in FIG. 5.

As arm 225 pivots and moves upwardly, the stationary drive sprocket 244 of chain-and-sprocket mechanism 232 is rotated by axle 230 in the counter-clockwise arrow 245 direction (FIG. 5). This drives chain 246 of mechanism 232 in the direction indicated by arrow 247, rotating the driven sprocket 250 of mechanism 232 in the counterclockwise direction. This moves pickup carriage 224, which rotates with driven sprocket 250 and the axle 234 on which that sprocket is mounted, into the "divider plucking" orientation and to the location shown in FIG. 5. In that orientation and location, the flexible tips 254 of the vacuum pickups 223 engage the lowermost divider 48 in hopper 208.

Negative pressure is applied to the vacuum pickups at this juncture to "secure" the divider to the vacuum pickups. The pivotable carriage arm 225 is then displaced by continued clockwise rotation of crank 226 in a counterclockwise direction as indicated by arrow 256 in FIG. 6. This downward, clockwise rotation of arm 225 is halted when the longitudinal centerline 236 of the arm again reaches and coincides with the "at rest" line 238.

This interrupted, clockwise rotation of arm 225 is important. With arm 225 in the rest position and a divider 48 secured by differential pressure to vacuum pickups 223, the divider is positioned for immediate placement on the next feedstock folder 144 moved by conveyor 172 to the first taping station 124.

As that folder approaches taping station 124, the motor (not shown) rotating crank 226 is again energized and rotated counterclockwise, causing carriage arm 225 to rotate clockwise and downwardly to the position shown in FIG. 6 as indicated by arrow 256.

As arm 225 rotates downwardly, the drive sprocket 244 of chain drive 232 rotates in an opposite, clockwise direction; and chain 246 moves in the arrow 258 direction. This results in vacuum pickup carriage 224 being rotated with driven sprocket 250 and the axle 234 on which that sprocket is mounted from: (a) the divider plucking orientation of the carriage shown in FIG. 5 to the orientation shown in FIG. 6A in which vacuum pickups 223 position the divider 48 immediately above the feedstock folder 144 approaching the first taping station 124.

Next, the pressure in vacuum pickups 223 is reversed, with a positive pressure blowing the divider 48 from the vacuum pickups onto folder panel 44.

The positive pressure in pickups 223 is then released and pivotable carriage arm 225 rotated, upwardly, again by continued clockwise rotation of crank 226, to the rest position indicated by line 238 in FIG. 5.

The importance of the above-discussed technique of advancing dividers 48 from tray (or hopper) 208 to the rest position 238 for immediate and accurate application to feedstock folders 144 can be appreciated when one takes into account that vacuum pickup mechanism 218 may be running at a rate of 2,400 cycles per hour or faster.

Figure 11:
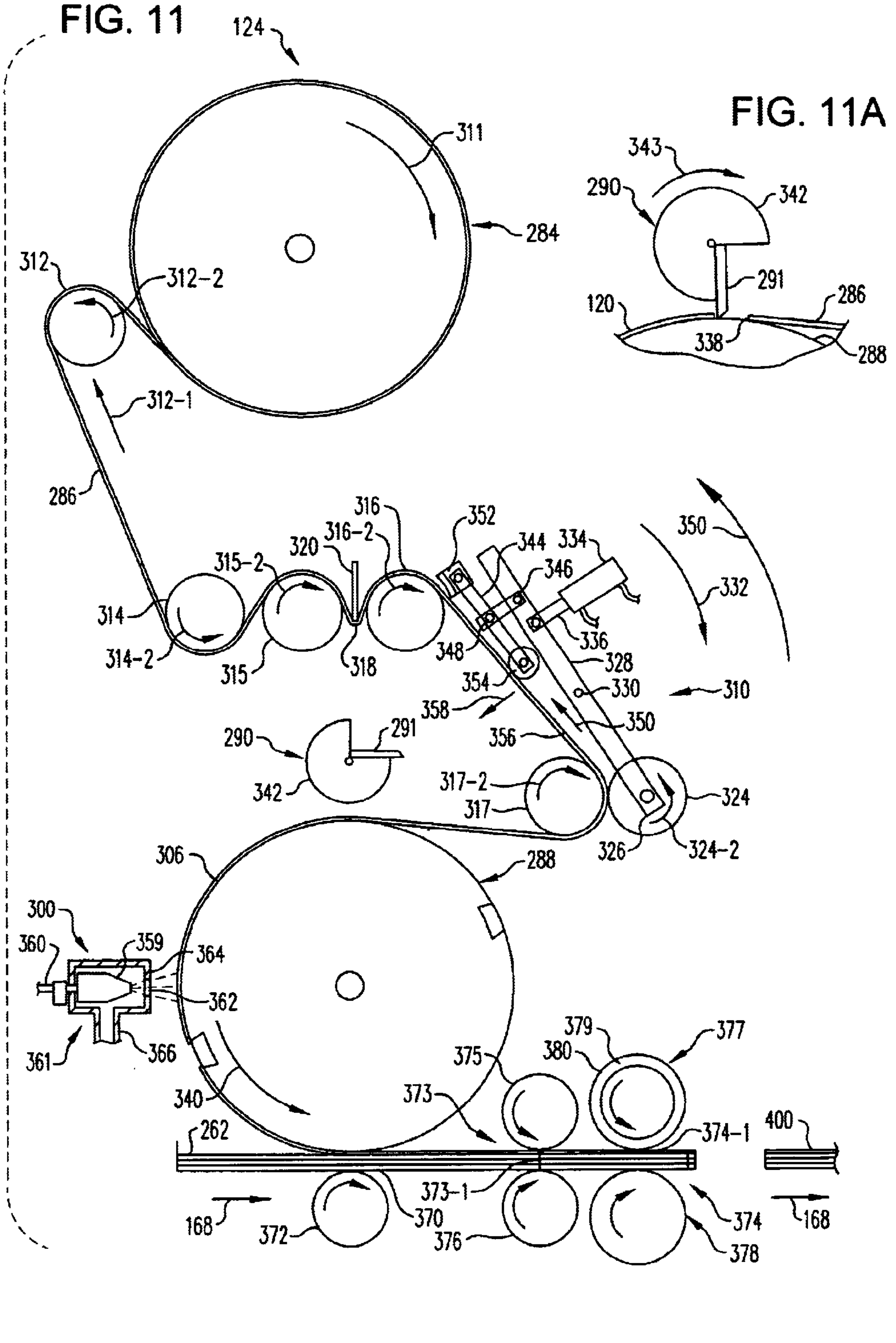
FIG. 11 is a side view of the FIG. 4 taping station.

Referring now to FIGS. 2, 4, and 11, the divider 48 placed on the front panel 44 of a feedstock folder 144 to form what will hereinafter be referred to as a divider/feedstock folder assemblage (identified by reference character 262 in FIG. 4) is aligned in the lateral direction with: (a) a stationary guide 266 which extends in the direction of travel 168 of the divider and feedstock folder and a jogger 268 which can be displaced by a pneumatic actuator 270, which has a piston rod 271 fixed to the jogger.

In its rest position, jogger 268 is in a retracted position. When a divider 48 is deposited upon a feedstock folder panel 44, jogger actuator 270 is triggered to displace the jogger to the left to the position shown in FIG. 4. As it moves to the left, the jogger engages the right-hand (or inner) edge 48*a* of divider 48, moving that file folder component toward, and into engagement with, the stationary, longitudinally extending, divider guide 266.

As the assemblage 262 of aligned feedstock folder 144 and divider 48 then moves in the arrow 168 direction toward the first taping station 124, the left-hand edge 274 of divider tab 74 is trapped against a horizontal ledge 276 of stationary guide 266 by a wheel 280 rotatably supported from a vertically oriented, integral component 282 of divider alignment guide 266 to hold down these file folder components. The material from which the feedstock folder 144 and divider 48 may be made is typically supplied in rolls and may consequently have a tendency to curl. The problems which a curled divider and/or feedstock folder panel might pose are eliminated by using the just-described arrangement for keeping these components flat. Similar mechanisms may be used elsewhere along machine 42 where desired to solve "curl" (and similar) problems.

Figure 7:
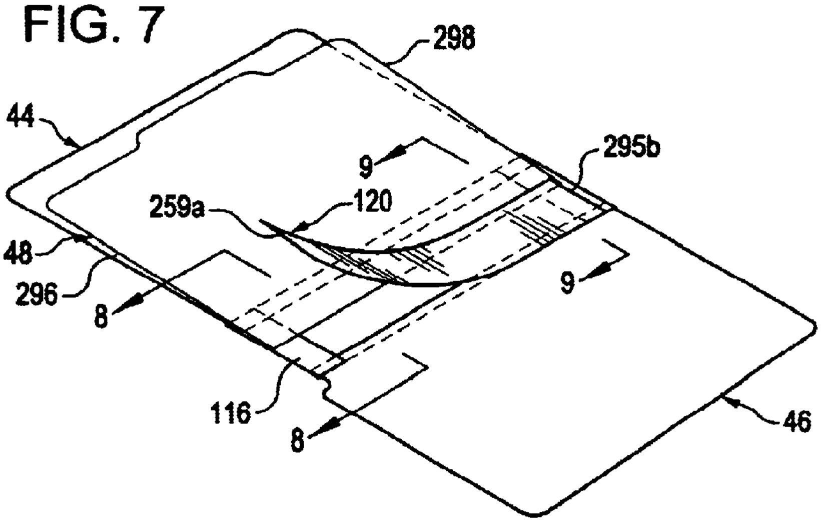
FIG. 7 shows, pictorially, the changing relation of the feedstock folder, the divider, and the tape segment as these components pass through the FIG. 4 taping station.

The first taping station 124 at which the feedstock folder/divider assemblage 262 next arrives includes an unwind roll 284 for a flexible, adhesively faced, typically TYVEK tape 286; a perforated, vacuum transfer roll 288 onto which tape 286 is trained, and a rotary knife 290 with a blade 291 for severing a segment 120 from tape 286 (see FIG. 7). The length of this segment is typically shorter than the distance 294 between the top (downstream) and bottom (upstream) edges 296 and 298 of divider 48 (see FIG. 7).

The adhesive (not separately shown) with which tape 286 is faced will typically, although not necessarily, be of the water-activated type. Vacuum transfer roller 288 carries the tape segment 120 past a spray unit 300 to activate the adhesive in a representative application of this character and then lays the tape segment on the apposite marginal portions 302 and 304 of divider 48 and feedstock folder real panel 46 with the adhesively faced side 306 of the tape segment 120 facing the divider/feedstock folder assemblage and the segment spanning the gap 308 between these marginal portions of the divider and back folder panel. The ends 295*a* and 295*b* of the tape in a typical operation will lie about one-eighth of an inch short of the upper and lower edges 296 and 298 of the divider. With the tape segment 120 cut shorter than the distance 294 between the divider top and bottom edges 296 and 298 (see FIG. 4), those ends will not extend beyond the top and bottom divider edges (undesirable), even if the tape is not precisely placed in that location lengthwise of the divider/flexible assemblage 262 (see FIG. 7).

Referring now primarily to FIG. 11, this figure shows a tape segment forming and transferring mechanism 310 which includes the unwind roll 284, vacuum transfer roll 288, and rotary knife 290 described above.

The adhesively faced tape 286 is led from unwind roll 284 in the direction indicated by arrow 311 around rolls 312, 314, 315, and 316 and metering roll 317 onto perforated vacuum transfer roll 288. As tape 286 passes from roll 315 to roll 316, it scrapes across the lower edge 318 of the thin, vertically oriented blade 319 shown in FIG. 11. This eliminates curl present in the tape as it is unwound from roll 284.

Roller 312 is biased in the direction indicated by arrows 312-1 in FIG. 11. This roll is one component of a standard, dancer arm brake assembly for applying tension to tape 286. This conventional mechanism is represented in FIG. 11 by roll 312 only for the sake of brevity and clarity. This mechanism keeps tape 286 under tension which, as one example, enables decurling knife to operate efficiently by keeping the tape taut as it passes over the edge 318 of the knife.

Arrows 312-2 . . . 316-2 show the directions of rotation of rolls 312 . . . 316.

The tape 286 is pulled from unwind roll 284 by the friction between metering roll 317 and a driven roll 324 lying on the opposite side of the tape from metering roll 317.

Reference characters 317-2 and 324-2 show the directions in which rolls 317 and 324 rotate. Roll 324 is rotatably is mounted at the end 326 of an arm 328 which pivots about axis 330. Arm 328 is biased in the clockwise direction indicated by arrow 332 in FIG. 11 against metering roll 317 to pull tape 286 from unwind roll 284 by a solenoid 334, which has a plunger 336 connected to the arm.

From metering roll 317, the leading end 338 of tape 286 is trained onto, and securely held by differential pressure to, vacuum transfer roll 288 (see FIG. 11A). The vacuum roll rotates in the counterclockwise direction indicated by arrow 340 in FIG. 11. This rotation moves the tape past knife blade 291 which is mounted on a rotary carrier 342. Carrier 342 is continuously rotated clockwise (arrow 343) in timed relationship to the rotation of vacuum transfer roll 288 from the FIG. 11 orientation to the FIG. 11A orientation to sever tape 286 at a location freeing a segment 120 of appropriate length from the tape.

A brake arm 344 is supported from pivot arm 328 by bracket 346. The brake arm pivots about axis 348. If the flow of divider/file folder assemblages 262 to taping station 124 is interrupted, the delivery of tape segments to that station by vacuum transfer roll 288 is likewise interrupted. Otherwise, tape segments would accumulate in the station. In even a best case scenario, machine 42 would have to be idled, with a consequent lack of production, while the tapes were removed.

In machine 42, the advance of tape 286 is halted, and the problem eliminated, by activating the solenoid 334 of mechanism 320. This rotates pivot arm 328 in the counterclockwise direction (arrow 350) about pivot axis 330, moving driven roll 324 away from metering roll 317. This eliminates the pressure between the two rolls needed to pull tape 286 from unwind roll 284.

At the same time, the pivotable movement of arm 328 in the arrow 350 direction presses brake 352 and a roll 354 at opposite ends of arm 344 against: (a) roll 316, and (b) tape 286 in the run 356 between roll 316 and metering roll 317. Brake 352 stops the movement of tape 286 at roll 316, allowing roll 354 to displace the tape 286 in run 356 in the arrow 358 direction. This retracts the leading end 338 of tape 286 from the tape severing locus of knife blade 291 (see FIG. 11A). That keeps the knife, which continues to rotate, from chopping unwanted slivers from tape 286, eliminating the maintenance problems which such slivers could cause.

Referring still to FIG. 11, the spray unit 300 employed to activate the adhesive with which tape 286 is faced (if a water-based adhesive is chosen) includes a nozzle 359 supplied with water through a line 360. Nozzle 359 is housed in a box 361 with water exiting from the nozzle passing through an orifice or window 362 in the downstream wall 364 of box 361 onto the adhesively faced side 306 of the flexible tape segments 120. The size and shape of window 362 determines the pattern of the water sprayed onto the tape segments, limiting the distribution of the water to the lateral span of the tape and to a distance along the tape which will insure that the adhesive is activated but not overwetted (which would adversely influence its bonding abilities). A drain 366 keeps water from collecting in casing (or box) 361.

Tapes with water-activated adhesives do not have to be employed in the manufacture of compartmented folders embodying the principles of the present invention. Among the other types of tapes that may be employed are those with heat- and solvent-activated adhesives.

As tape segment 120 is carried past spray unit 300 by vacuum transfer roll 288, the divider/feedstock folder assemblage 262 approaches a nip 370 between vacuum wheel 288 and a cooperating press roll 372. The transfer roll lays the tape segment 120—beginning at the top edge 296 and progressing to the bottom edge 298 of divider 48—with its adhesively faced side 306 facing downward on the divider/feedstock folder assemblage 262. The tape segment extends in the direction of travel 168 of the assemblage. The tape segment spans the gap 308 between the apposite marginal portions 302 and 304 of divider 48 and feedstock folder back panel 46 and laps evenly onto those marginal portions (see FIGS. 7–9).

As the assemblage and laid on tape segment 120 then pass through nip 370, vacuum is turned off; and the vacuum transfer roll 288 and press roll 372 exert pressure on these file folder components to bond the tape segment to the marginal portions 302 and 304 of divider 48 and feedstock folder back panel 46. To promote the integrity of the bond between the tape segment and the folder components, the feedstock folder/divider assembly 262 and adhered tape segment 120 are then passed through the nips 373-1 and 374-1 of upstream and downstream sets 373 and 374 of upper and lower press rolls 375/376 and 377/378.

Figure 10:
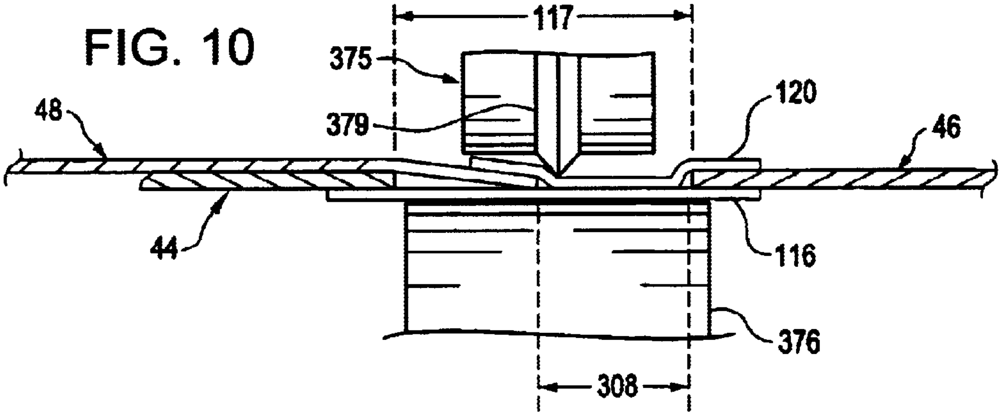
FIG. 10 is a view similar to FIGS. 8 and 9 of the feedstock folder-divider-tape assemblage after the tape segment has been pressed against the divider, the feedstock folder rear panel, and the feedstock folder hinge tape to eliminate gaps in the divider-to-panel and tape-to-tape bonds and otherwise increase the strength of the bonds.
Figure 13:
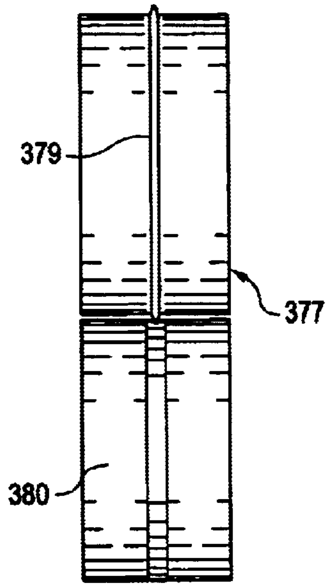
FIG. 13 is a perspective view of a raised-edge roller employed in the FIG. 4 taping station to crimp the tape applied in that station against the edge of the feedstock folder back panel as shown in FIG. 8.

As shown in FIGS. 10 and 13, an integral ridge 379 extends around the periphery 380 of the upper press roll 377 in the downstream set 374 of press rolls. As assemblage 262 with tape segment 120 passes through the nip 374-1 between press rolls 377 and 378, this ridge presses the marginal portion 302 of divider 48 and tape 304 of segment 120 downwardly as shown in FIG. 10 to bond the tape segment to the tape 116 between, and joining together, the front and back folder panels 44 and 46.

The bottom rolls 376 and 378 in press roll sets 373 and 374 are preferably fabricated from a soft urethane or comparable material. This enables the press rolls to deform the tape segments 118 and 120 firmly into firm contact with rear folder panel 46, divider 48, and panel joining tape segment 116, eliminating air gaps and forming strong bonds.

Figure 12:
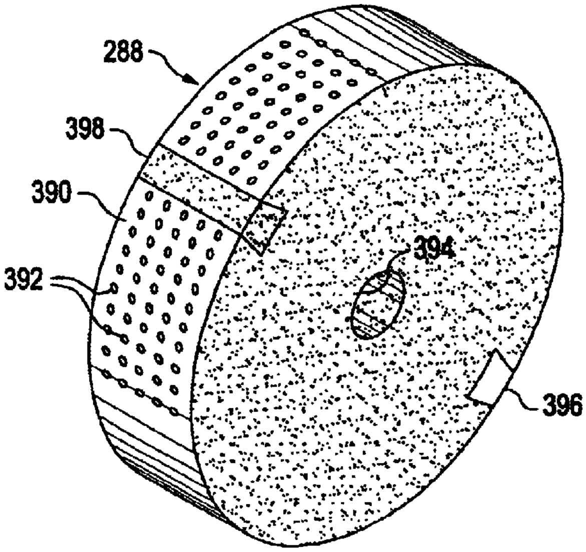
FIG. 12 is a perspective view of a perforated vacuum wheel employed in the FIG. 4 taping station; this vacuum wheel is used in transferring and applying the tape segment to the feedstock folder back panel and to the hinge tape and the feedstock divider.

Referring now to FIG. 12, the perforated vacuum wheel 288 of taping station 124 is in respects a significant feature of the present invention. This roll (see FIG. 12) has a peripheral component 390 in which perforations 392 are formed and a central bore 394 for an axle (not shown) having a passage communicating with perforations 392 so that a negative pressure can be applied to tape 286 and tape segments 120 to adhere those items to the vacuum transfer roll. Hardened, peripheral inserts 396 and 398 are installed 180° apart in vacuum transfer roll 288. Those inserts are anvils for segment cutting knife blade 291. Two segments 120 are cut from tape 288 in each revolution of the vacuum transfer roll so that a segment 120 will be properly positioned for transfer to a feedstock folder/divider assemblage 262 arriving at taping station 124 (see FIG. 11).

Figure 14:
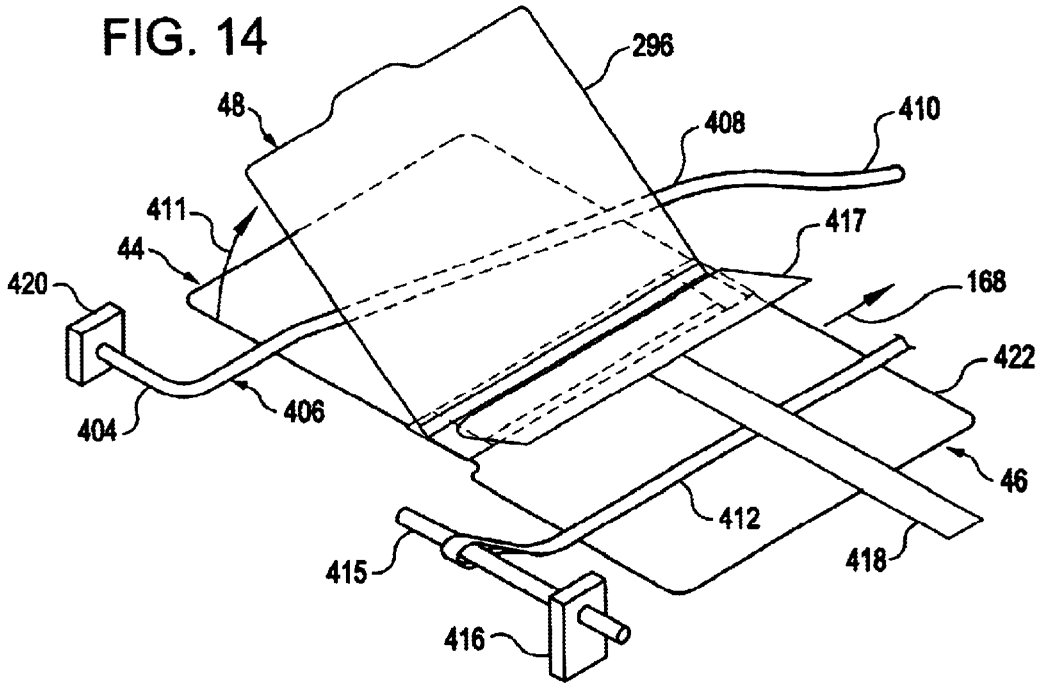
FIG. 14 is a perspective view of machine components employed in the FIG. 2 machine downstream of the FIG. 4 taping station to: (a) flip the internal divider over and expose its untaped side, (b) catch the divider as that component is flipped over, and (c) keep the tape segment applied in the FIG. 4 taping station from peeling away from the folder components to which it is bonded in the taping station.
Figure 15:
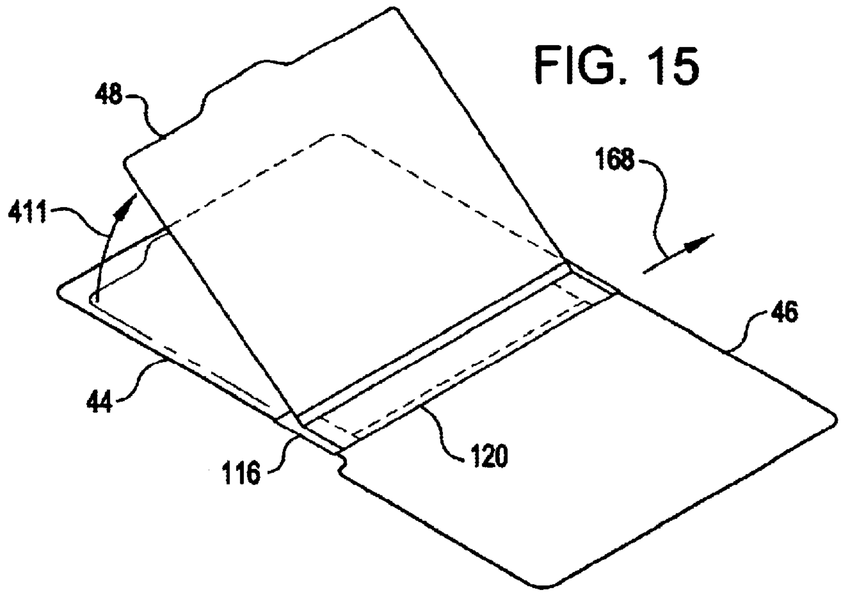
FIG. 15 shows the assemblage fabricated in the FIG. 4 taping station with the divider in the course of being flipped (or turned over) to expose the untaped side of the divider.
Figure 19:
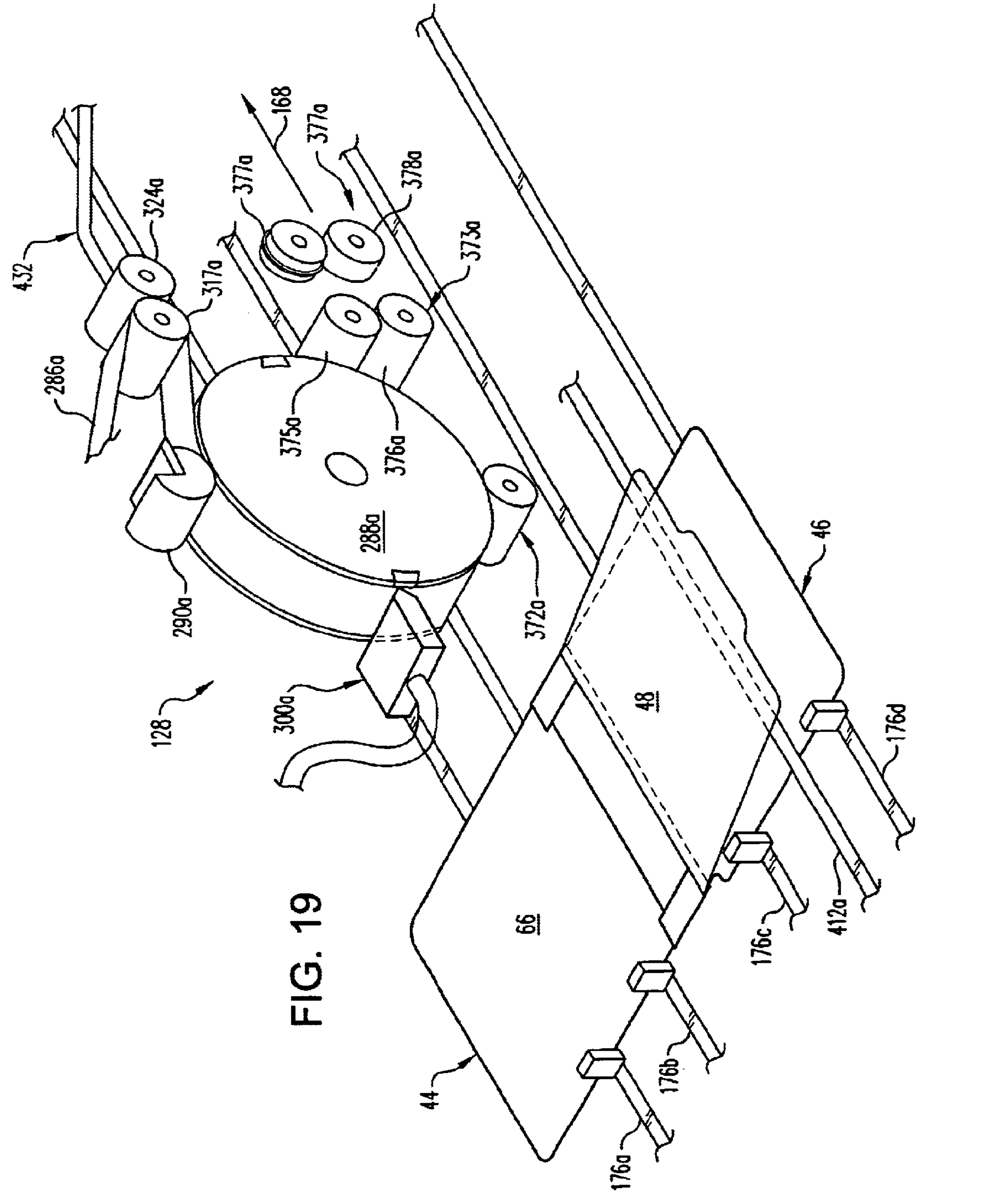
FIG. 19 is a perspective view of the second taping station.

Referring now to FIGS. 2 and 14, unit 400 (FIG. 11) comprising now bonded together feedstock folder, divider 48, and tape segment 120 travels in the arrow 168 direction from the first taping station 124 to the second taping station 128. As unit 400 reaches the taping station, the leading or top edge 296 of divider 48 engages and rides over the laterally extending segment 404 of stationary plow bar 406. As the unit 400 continues in the arrow 168 direction, divider 48 lies on and travels along an integral, longitudinally extending segment 408 of the plow bar until the divider reaches an also integral, upwardly, inwardly, and longitudinally extending segment 410 of the stationary plow bar 406. This segment 410 rotates (or tips) divider 48 upwardly in a counterclockwise direction as indicated by arrow 411 in FIG. 14 and in FIG. 15 until the divider passes dead center and falls by gravity onto the longitudinally extending divider support 412 as shown in FIGS. 14 and 19. This exposes the obverse, untaped side 414 of the divider and the inner side 66 of feedstock folder front panel 44 (see FIGS. 15, 16, and 17). Support 412 extends to pleating section 132 of machine 42 (see FIGS. 19 and 20) where it guides divider 48 between two pleating section guides discussed hereinafter. Support 412 is mounted as by a transversely extending rod 415 and block 416 to the frame (not shown) of machine 42.

As unit 400 travels past plow 406, a holddown 417 mounted to the frame of machine 42 by a transversely extending support 418 holds back folder panel 46 and tape segments 116 and 120 against the upper run 196 of conveyor 172. In the absence of this holddown or something comparable, plow bar 406 would lift the folder assemblage 400 off of conveyor 172; and machine 42 would not function properly, if at all.

Plow bar 406 is supported from the frame of machine 42 by a block-type mount 420 which is positioned laterally beyond the feedstock folders travelling in the arrow 168 direction beyond the left-hand feedstock folder edges 421 and upstream from tape applicator roll 288 such that the plow bar will pick up the tab edge 74 of divider 48 as the leading (or top) edge 422 of the feedstock folder/divider assemblage 262 moves beyond divider positioning guide 266 and jogger bar 268 to the nip 370 between the tape applicator roll 288 and press roll 372. Plow mounting block 420 is supported in any convenient manner from the frame of machine 42.

Figure 16:
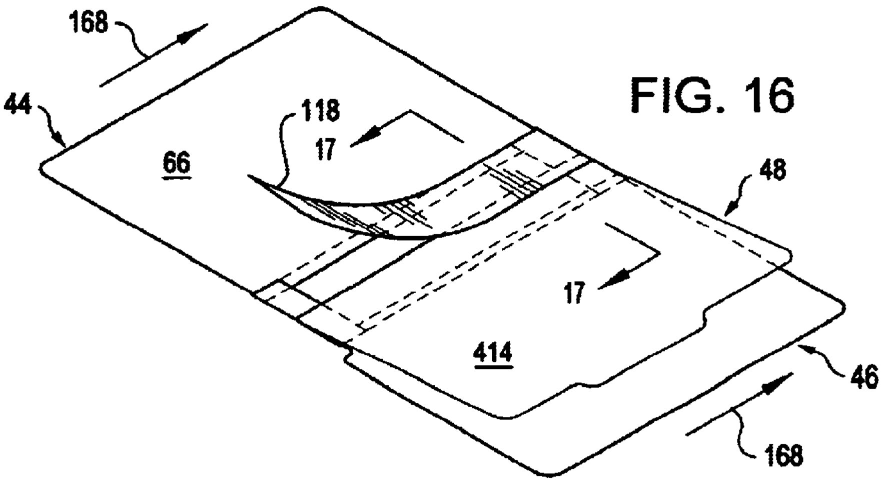
FIG. 16 shows the FIG. 15 assemblage and a second segment of tape being applied and bonded to: the divider, the front panel of the feedstock folder, and that segment of the hinge tape between the apposite edges of the front panel and divider; this tape is delivered to, and applied in, the second, downstream taping station shown in FIG. 2.
Figure 17:
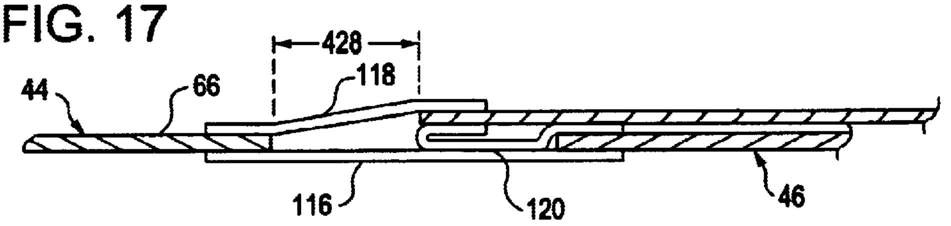
FIG. 17 is a section taken along line 17—17 of FIG. 16 through a portion of the folder assemblage shown in FIG. 16 as that assemblage passes through the downstream taping station; the tape has at this location been bonded to the feedstock folder front panel, the divider, and the hinge tape.
Figure 18:
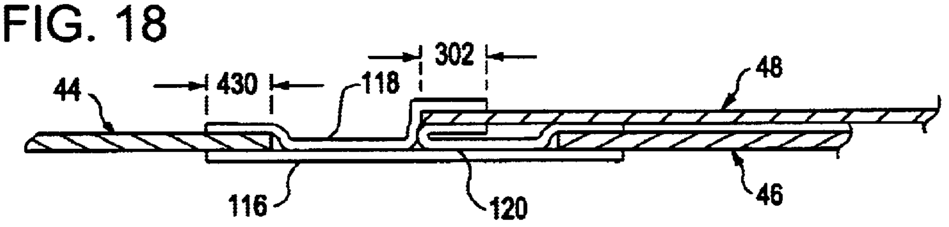
FIG. 18 is a section through the FIG. 16 folder assemblage which is similar to the FIG. 17 section but shows the item as it appears upon being discharged from the second downstream taping station; at this juncture the tape has been crimped and pressed by compression rolls against the divider, feedstock folder panel, and hinge tape to eliminate gaps in and otherwise increase the bonds between the just-named folder components.

Referring to now to FIGS. 2 and 16–19, the unitary arrangement 400 of feedstock file folder 144 and divider 48 joined together by tape segment 120 proceeds from stationary plow bar 406 to the second taping station 128. At taping station 128, the second segment of tape 118 is applied to the unitary assembly 400 to bond divider 48 to the front panel 44 of feedstock folder 144. As is best shown in FIGS. 16 and 17, tape segment 118 spans the gap 428 between the apposite marginal portions 302 and 430 of divider 48 and feedstock front panel 44 and laps evenly on to those margins. Like its counterpart 120 and for the same reason, tape segment 118 is dimensioned to fall slightly short of the top and bottom edges 296 and 298 of divider 48.

The mechanisms and components at taping station 128 essentially duplicate those found at the first taping station 124 and described above. Consequently, the station 128 components and mechanisms, identified with the same reference characters as their station 124 counterparts followed by the letter "a," will not be described herein in the interest of brevity and clarity except as is necessary for a full understanding of the present invention.

It will of course be obvious to the reader that the vacuum transfer roll **288*a* at taping station 128 applies a different tape segment (118) to a different pair of file folder components (48 and 44) than its taping station 124 counterpart does. Upstream press rolls 375*a* and 376*a* act on tape segment 118 to promote bonds between that segment and file folder components 48 and 44 (see FIG. 17), and the ridged press roll 377*a*, with its companion roll 378*a*, acts on tape segment 118 to bond that segment to the tape segment 116 spanning the gap 428 between front folder panel 44 and divider 48**.

Figure 20:
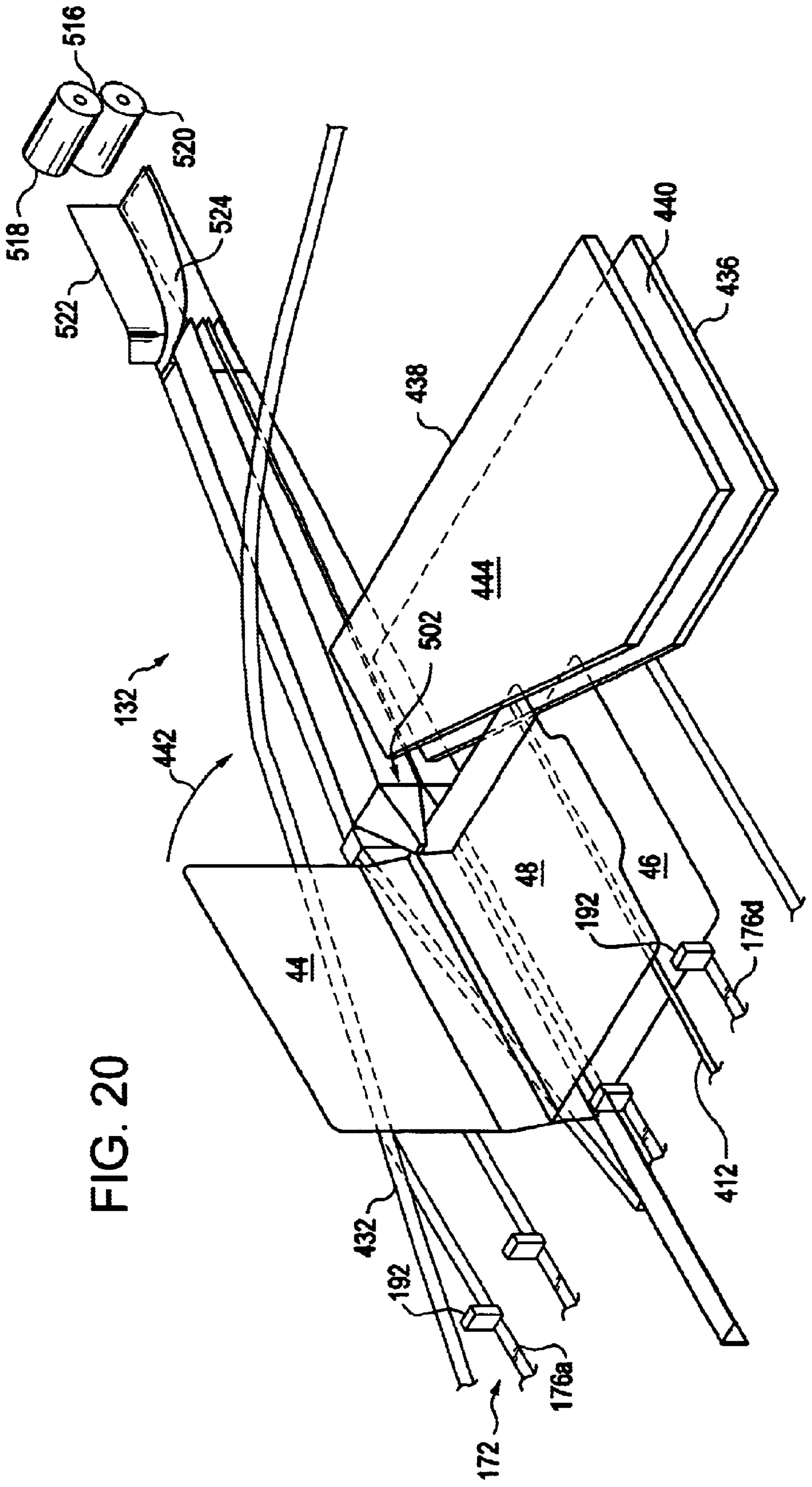
FIG. 20 is a perspective view of a pleating section which, if an expandable folder is wanted, is employed to crease and form pleats in: (a) the tapes between the internal divider and the front folder panel, and (b) the tapes between the divider and the back folder panel; in addition to creasing blades for forming the pleats, this section has compression rolls for setting the pleats; in this view, the leading edge of the folder assemblage has just reached the upstream ends of the creasing blades.

Referring now to FIG. 20, the file folder unit 400 with divider 48 now taped to the front panel 44 of feedstock file folder 144 travels from the second taping station 128 in the arrow 168 direction past a stationary plow bar 432 to pleating station 132. Plow bar 432 is of generally the same configuration as its reference character 406 counterpart and may be mounted to the frame of machine 42 in the same manner as the latter. Consequently, plow bar 432 will not be described further herein.

As unit 400 reaches pleating station 132, file folder rear panel 46 rides onto a folder-support table 434 (FIG. 21) and passes beneath the lower one of two, vertically spaced apart, horizontally oriented guide plates 436 and 438, divider 48 being guided into the gap 440 between the guide plates by support 412. Stationary plow bar 432 rotates or flips the front file folder panel 44 in the clockwise direction indicated by arrow 442 in FIG. 20 on to the upper surface 444 of guide plate 438. This positions the divider and folder panels 48, 44, and 46 in the parallel, spaced apart relationship shown in FIG. 23.

Figure 23:
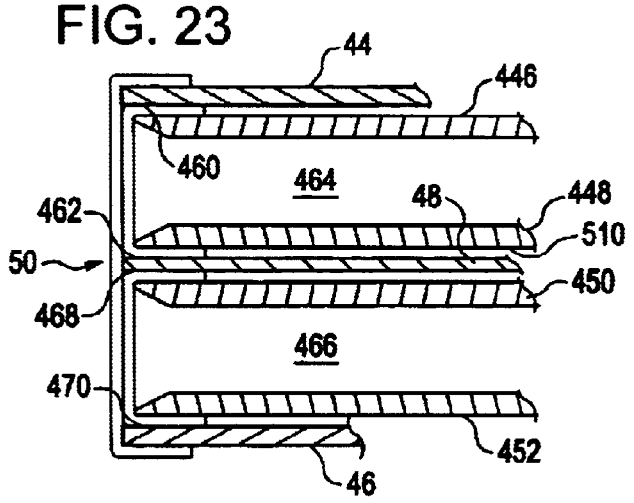
FIGS. 23, 24, and 25 depict transverse sections of the feedstock folder-divider-tape assemblage as that assemblage is displaced along the creasing blades of the pleating section; these figures show the relationship and interactions between the folder assemblage and creasing blades at the stations identified as 23—23, 24—24, and 25—25 in FIG. 22.

As the file folder unit 400 continues in the arrow 168 direction, it moves along: (a) stationary creasing blades 446, 448, 450, and 452 on the right-hand side of the folder hinge 50 formed by the three bonded together tape segments 116, 118, and 120 and (b) complementary, also stationary, creasing blades 456 and 458 on the opposite side of the hinge. Creasing blades 446 and 448 end up in, and at opposite, top and bottom sides 460 and 462 of the upper material storage compartment 464 between folder front panel 44 and divider 48. The two lower creasing blades 450 and 452 are similarly positioned in the lower material storage compartment 466 between divider 48 and back holder panel 46 at the top and bottom sides 468 and 470 of that compartment. Knife edges 472, 474, 476, and 478 of these four creasing blades engage segments of hinge 50 as shown in FIG. 23.

Figure 24:
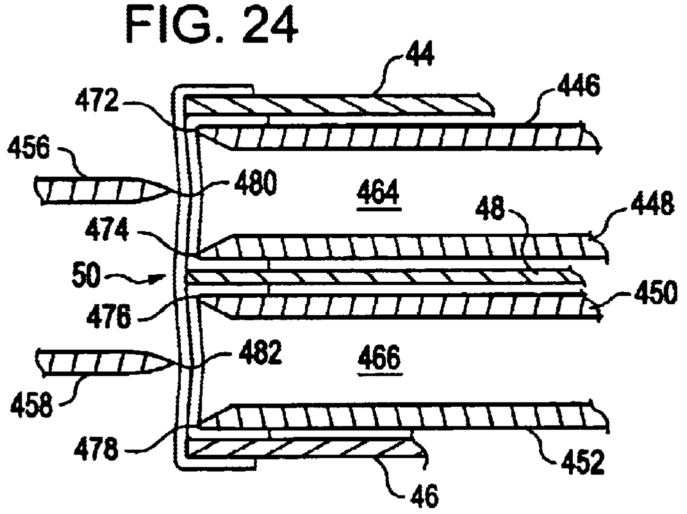

The two, opposite side creasing blades 456 and 458 appear at locations midway between: (a) the upper and lower creasing blades 446 and 448 in file folder compartment 464, and (b) the upper and lower creasing blades 450 and 452 in lower file folder compartment 466. Knife edges 480 and 482 of creasing blades 456 and 458 are adjacent to and face tape segment hinge 50 as shown in FIG. 24.

Figure 25:
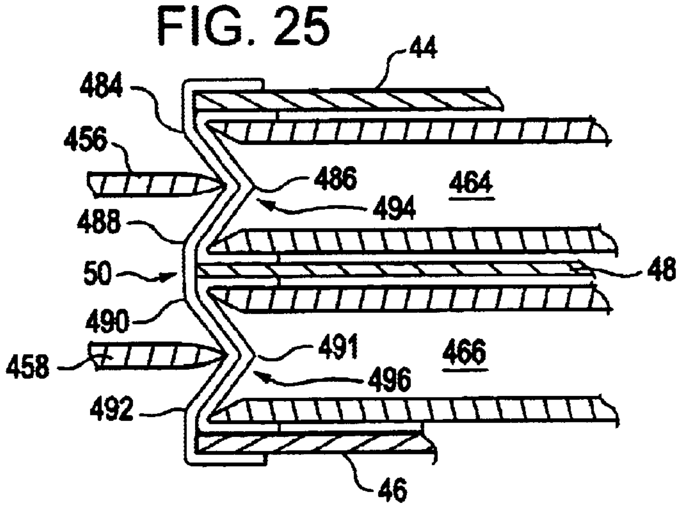
Figure 25A:
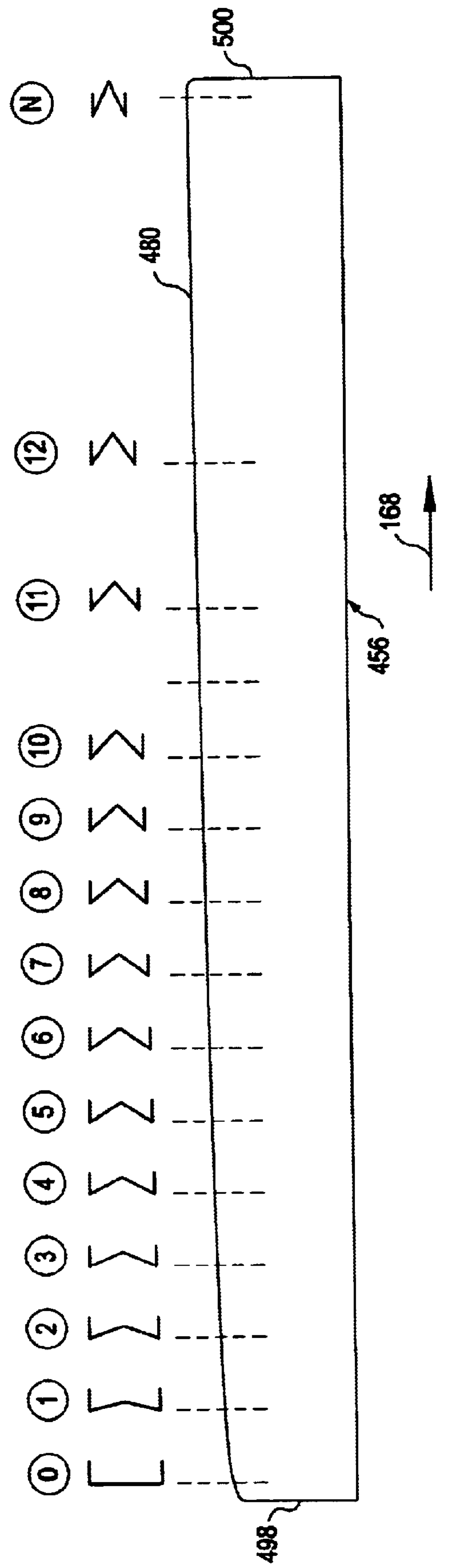
FIG. 25A is a plan view of a representative creasing component employed in the FIG. 21 pleating section; this figure shows the contour of the creasing component knife edge and the configuration of the pleat at various stations along the pleating section.

As unit 400 is moved by conveyor 172 further along creasing blades 446 . . . 452, 456, and 458, the knife edges 480 and 482 of creasing blades 456 and 458 move to the right relative to, and beyond, the knife edges 472 . . . 478 of creasing blades 446 . . . 452 as shown in FIGS. 25 and 25A. This folds the tape segments making up hinge 50 on creasing blade knife edges 472 . . . 482, forming the creases identified by reference characters 484, 486, 488, 490, 491, and 492 in FIGS. 25 and 25A with the sharpness of these creases increasing at each station ① . . . ⓝ along the creasing blades. This results in the formation of a first pleat 494 in the hinge 50 at the left-hand end of folder compartment 464 and the formation of a second pleat 496 in the hinge at the left-hand end of the lower folder compartment 466.

The formation of the creases just discussed requires that the knife edges 480 and 482 of the two left-hand side creasing blades 456 and 458 have an approximately hyperbolic contour which is sharply curved at the upstream end of the creasing blade; then less steeply curved; and, finally, straight at the downstream end of the creasing blade. An appropriate contour for the knife edge 480 of representative creasing blade 456 is shown in FIG. 25A in which the upstream end of the blade is identified by reference character 498 and the downstream blade end by reference character 500.

The formation of sharp creases is also promoted by mounting creasing blades 446 and 448, creasing blades 450 and 452, and creasing blades 456 and 458 from the frame of machine 42 such that: (a) those components converge on a line (not shown) near the nip between two hereinafter described pleating section press rolls, and (b) the distances between the two components in each of the foregoing pairs decreases from the upstream end 498 of pleating section 132 to the downstream end 500 of that section.

Figures 21, 21A:
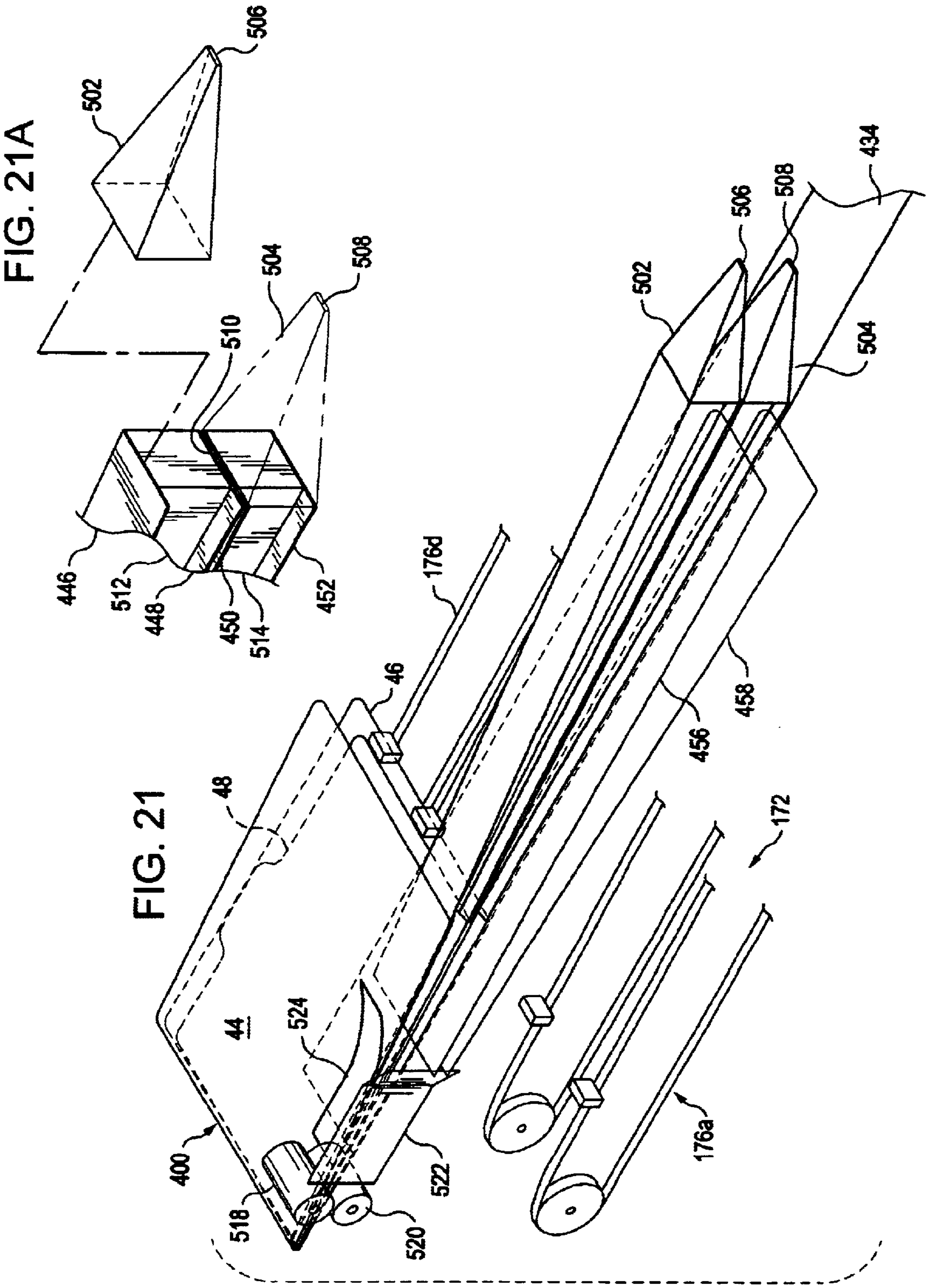
FIG. 21 is a second perspective view of the pleating station; in this view the trailing edge of the folder assemblage is approaching the downstream end of the creasing blades and the leading edge of the assemblage has passed through the compression rolls of the pleating section.
FIG. 21A is a fragment of FIG. 21 with certain components of the pleating section exploded, and shown in phantom lines, to better show creasing components of the FIG. 21 pleating section.

Referring now primarily to FIGS. 21 and 21A, pleating section 132 includes wedge-shaped caps 502 and 504 which, in profile, come to a point 506 or 508 at the end of the cap facing the upstream pleating section end 498. As folder unit 400 approaches the pleating blades, these caps guide folder front panel 44 on to pleating blade 446 and divider 48 into the gap 510 (see FIG. 23) between pleating blades 448 and 450, ensuring that the pleating blades 446 . . . 452 end up, without binding or jamming, in the appropriate folder compartments 464 and 466.

Creasing blades 446, 448, and 450, 452 are mounted on blocks 512 and 514 which extend in the longitudinal, arrow 168 direction. Guide caps 502 and 504 are also attached to those blocks. Creasing blade support blocks 502 and 504 and creasing blades 456 and 458 are mounted in any convenient manner (not part of the present invention) to the frame of machine 42.

Figure 22:
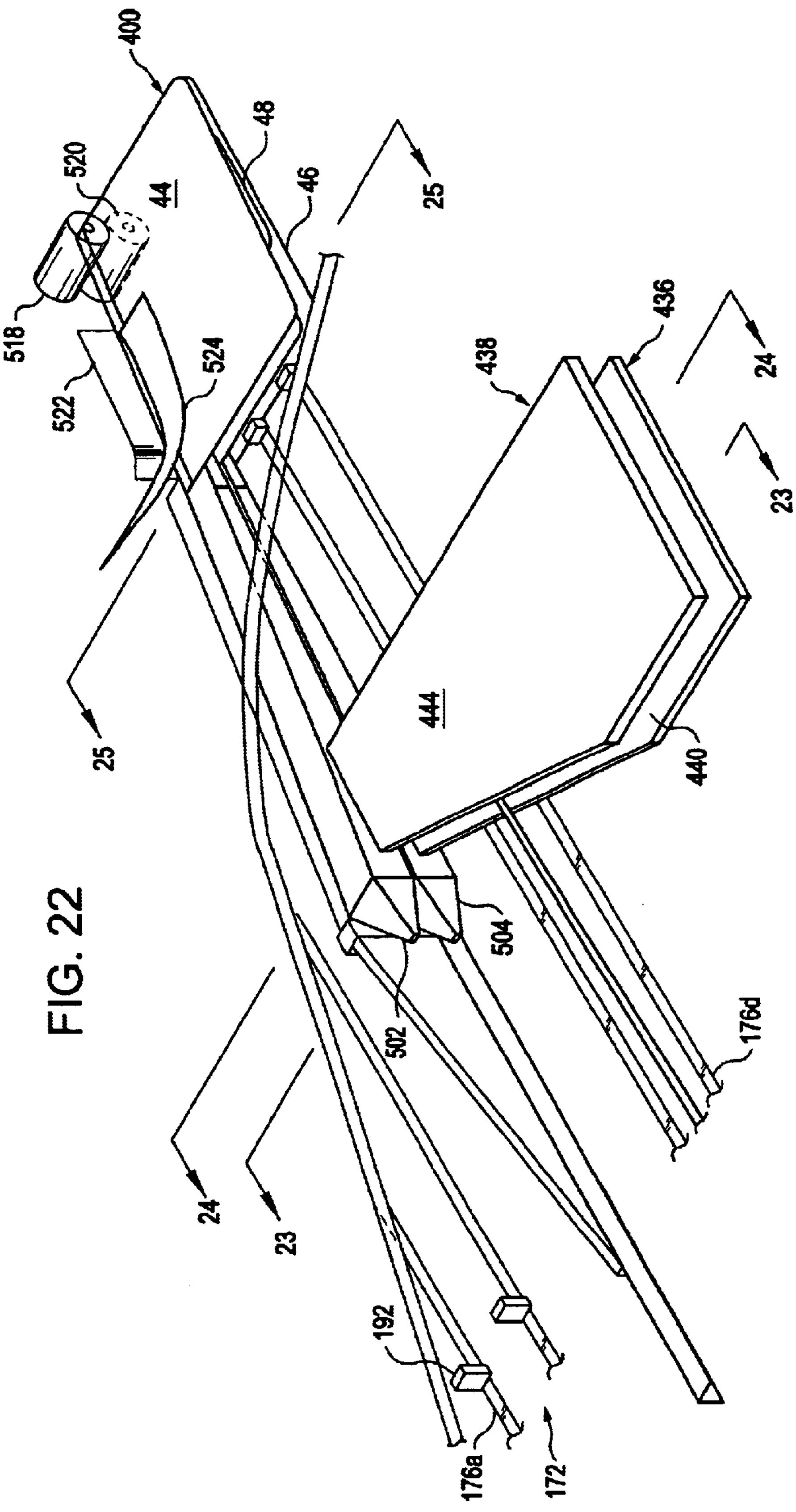
FIG. 22 is a third perspective view of the pleating section provided to further facilitate an understanding of that section; in this figure the folder assemblage is in approximately the same location in the pleating section as that assemblage is in the FIG. 21 perspective view.
Figure 26:
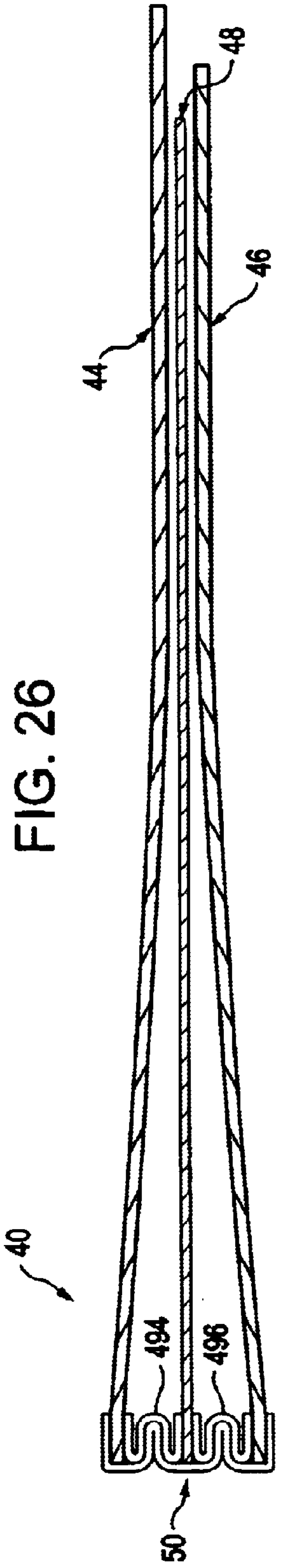
FIG. 26 is a transverse section through the completed folder as that folder is discharged from the compression rolls of the pleating section.

Referring now to FIGS. 21 and 22, conveyor 172 moves the file folder unit 400 in the arrow 168 direction from the creasing blades discussed above through the nip 516 between upper and lower press rolls 518 and 520 to set the creases 484 . . . 492 formed by the creasing blades (see FIG. 26).

As the file folder unit 400 moves to press rolls 518 and 520, it is guided by a longitudinally extending component 522 engaged by the hinge 50 of the folder unit 400. A spring type, longitudinally extending, overhead holddown 524 engages front folder panel 44 as the folder unit 400 moves to the press rolls. This compresses hinge 50, typically in a configuration resembling that shown at station n in FIG. 25A, enabling the hinge side of the folder unit to move freely and without interference into press roll nip 516. This completes the manufacture of file folder 40.

Figure 27:
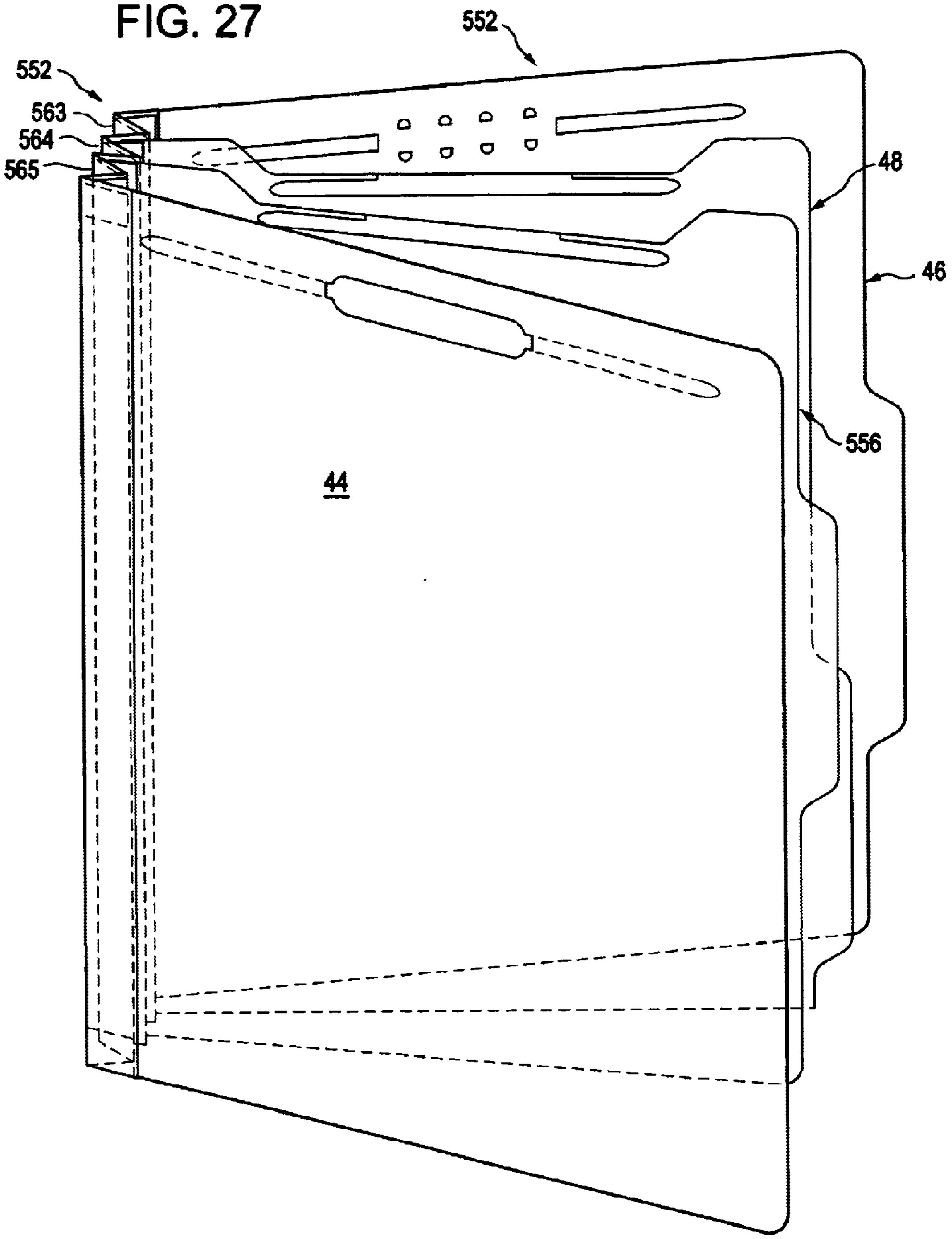
FIG. 27 is a perspective view of a second folder embodying the principles of the present invention; this folder differs from the folder shown in FIG. 1 in that it has two internal dividers; this folder can be manufactured on the FIG. 2 machine by adding one additional taping station to that machine; conversely, one can employ a FIG. 2 machine with three taping stations to manufacture a folder as shown in FIG. 27 and idle one of those stations to manufacture a folder with a single internal divider as shown in FIG. 1.

Referring still to the drawings, it was pointed out above that the principles of the present invention, and machinery employing those principles, may be employed to fabricate file folders which have two or more internal dividers as well as the single divider file folders discussed above. A representative file folder with two internal dividers 48 and 550 providing three material storage compartments 551-1, 551-2, and 551-3 (FIG. 34) is illustrated in FIG. 27 and identified by reference character 552.

Figure 35:
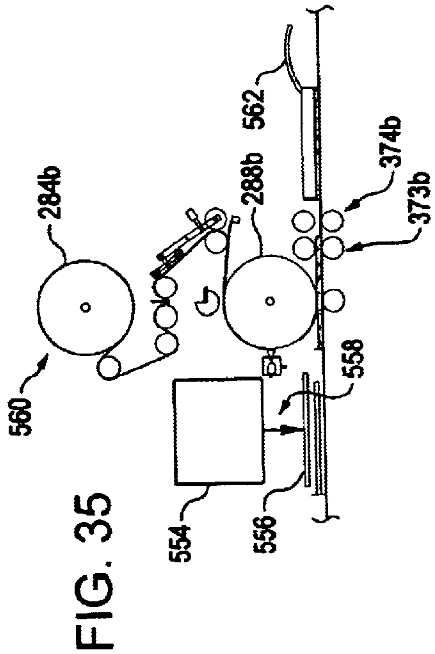
FIG. 35 is a side view of the components that might be added to the FIG. 2 machine to give that machine the capability of manufacturing file folders with two internal dividers; viz., a diagrammatically shown feed hopper/transfer mechanism for the "second" internal divider; a third taping section; and an additional plow bar.
Figure 30:
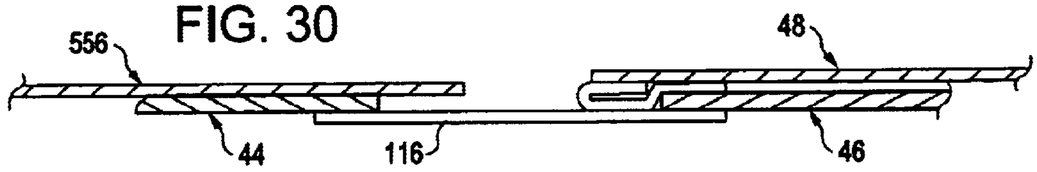
Figure 31:
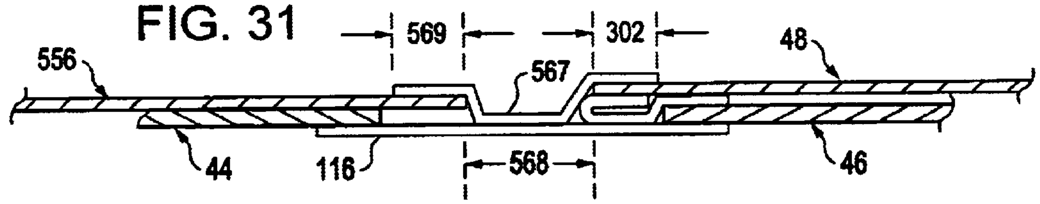
Figure 32:
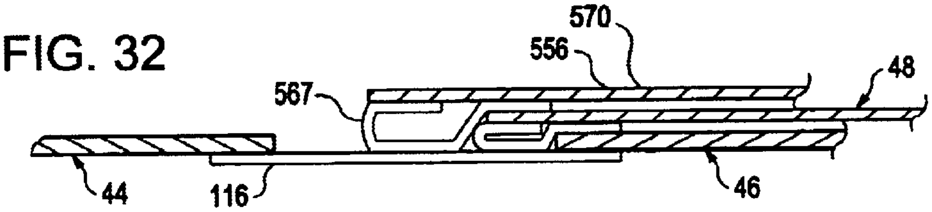
Figure 33:
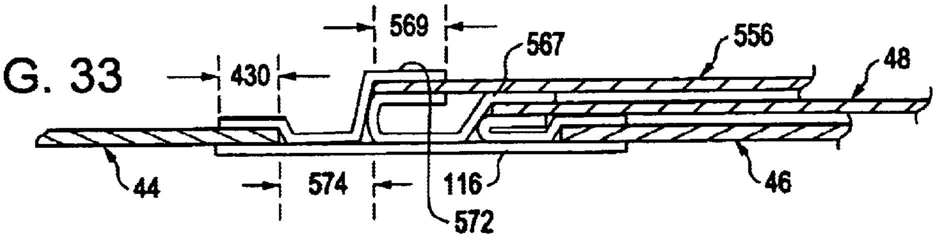

File folder 552 may be manufactured by adding to the machine 42 illustrated in FIG. 2 between the second, downstream plow bar 432 of that machine and its pleating section 132, the elements shown in FIG. 35; viz., a tray or hopper 554 (or a comparable unit) for dividers 556 (see FIG. 30), a second vacuum transfer mechanism 558 for plucking dividers from unit 554 and placing them on the front panel 44 of a feedstock file folder unit 400 moved by conveyor 172 in the arrow 168 direction past the transfer mechanism to a third taping station 560, and a third stationary plow bar 562 for rotating the front folder panel 44 as the unit with both dividers taped in place reaches pleating section 132. Also, a pleating section with a third horizontal guide akin to those identified by reference characters 436 and 438 and a third set of two right-hand side and one left-hand side creasing bars is provided in order to form three pleats 563, 564, and 565 in hinge 566 at the left-hand ends of all three of the compartments 555-1, 555-2, and 555-3 in folder 552.

The steps performed in assembling a file folder such as 552 with two internal dividers 48, and 556 are shown in FIGS. 28–33.

Figure 28:
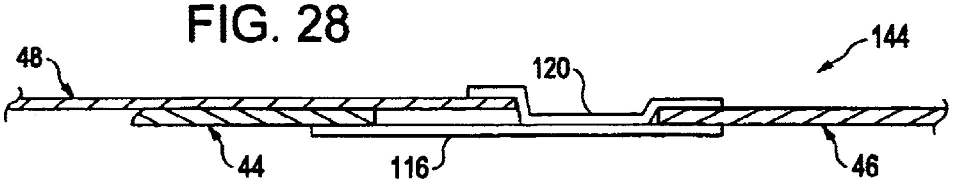
FIGS. 28–33 are transverse sections showing FIG. 27 folder as it appears after successive steps of the manufacturing process; specifically.

FIG. 28, more particularly, depicts a feedstock file folder 144 after the feedstock folder has been run through the first taping station 124 and tape segment 120 bonded to divider 48, back folder panel 46, and the tape segment 116 joining the front and back panels together.

Figure 29:
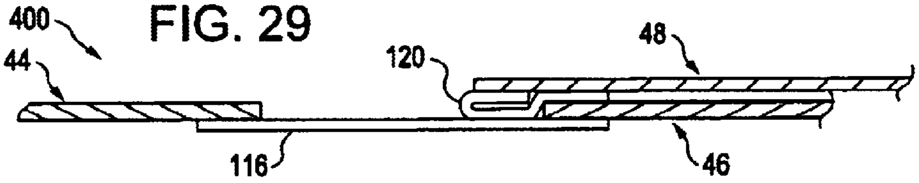

FIG. 29 shows the resultant unit or assemblage 400 with divider 48 rotated in a counterclockwise direction by upstream plow bar 406 and gravity onto back folder panel 46. Next, as discussed briefly above and shown in FIG. 30, a divider 556 is plucked from divider storage unit 554 and placed on the front panel 44 of the feedstock folder. The components previously assembled into the unitary structure 400 with divider 556 now in place are then moved by conveyer 172 in the arrow 168 direction to the second taping station 128. Here, in the manufacture of a two-divider folder, a tape segment 567 is applied to bond divider 48 to divider 556. Tape segment 567 spans the gap 568 between the two dividers and laps onto the apposite marginal portions 302 and 569 of the dividers. The two, upstream and downstream sets 373*a* and 374*a* of press rolls in taping station 128 ensure that tape segment 567 is securely bonded to divider 48, divider 556, and the tape segment 116 joining together the feedstock folder front and rear panels 44 and 46.

The taping station 560 components are identified by the same reference characters as their station 124 counterparts followed by letter "b".

Downstream from the second taping station 128, the second, downstream, stationary plow bar 432 and gravity rotate the second divider 556 in a clockwise direction onto the first of the installed dividers 48, exposing the obverse, untaped side 570 of divider 556. In the third taping station 560, a fourth segment 572 of tape is applied and bonded to divider 556, front folder panel 44, and the panel-joining tape segment 116. Tape segment 572 spans the gap 574 between front panel 44 and divider 556 and laps onto the apposite, marginal portions 569 and 430 of divider 556 and panel 44.

Figure 34:
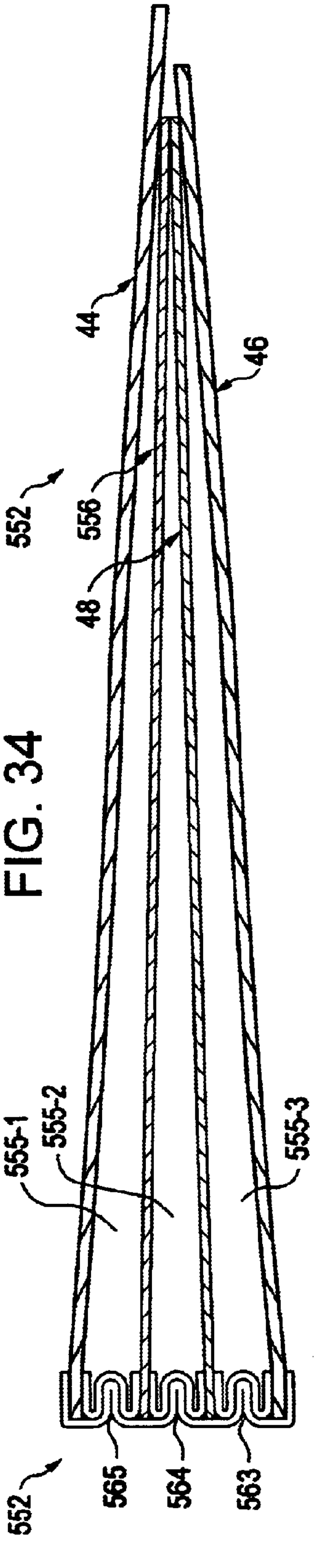
FIG. 34 is a section through the FIG. 27 folder after the assembled components have been moved through a pleating section as shown in FIGS. 20–22 to make the folder expansible by forming pleats between: (a) the front folder panel and the second of the internal dividers; (b) the two internal dividers, and (c) the first of the internal dividers and the back folder panel.

This application and bonding of tape segment 572 completes the assembly of file folder 552 which, after pleating and with the front and back panels folded together, appears as shown in FIG. 34.

Figure 36:
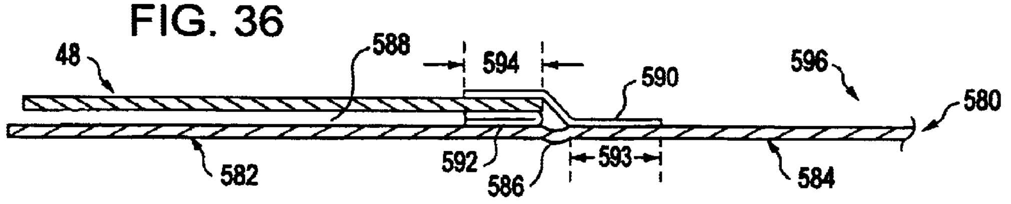
FIG. 36 is a section through a folder which embodies the principles of the present invention, has one internal divider, and is not expansible.

In applications where expandable material filing compartments are not required, a feedstock folder like that identified by reference character 144 in which front and back panels are joined in a spaced relationship by a flexible tape may be replaced with a less expensive feedstock file folder of the character shown in FIG. 36. This feedstock folder, identified by reference character 580, has integral front and rear panels 582 and 584 with a crease 586 extending from the top to the bottom of the feedstock folder between these two integral panels. This crease enables the two panels of the folder to be folded together and is a conventional expedient.

A divider 48 is installed in the feedstock folder to divide the space between the front and rear panels 582 and 584 of the folder into two compartments. One of these compartments lies between front folder panel 582 and divider 48 and is identified by reference character 588. The second compartment, not shown in FIG. 36, lies between divider 48 and the back panel 584 of the feedstock folder.

Divider 48 is joined to the feedstock folder with tape segments 590 and 592. Segment 590 laps onto the apposite, marginal portions 593 and 594 of rear panel folder 584 and divider 48. The resulting folder, identified by reference character 596, may be fabricated on a machine akin to the FIG. 2 machine 42 with two taping stations 124 and 128 and a plow bar 406 but no pleating section.

Figure 37:
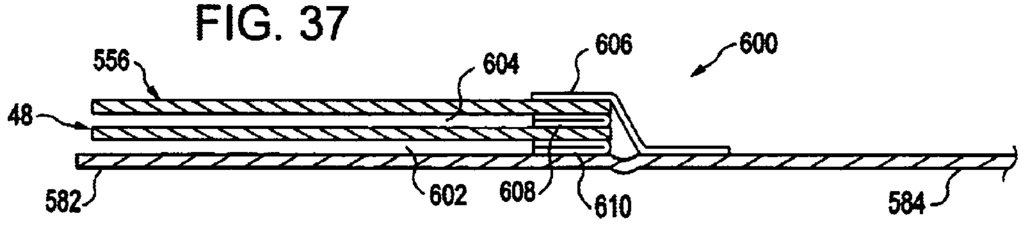
FIG. 37 is a view, similar to FIG. 36, of a non-expansible folder with two dividers.

FIG. 37 depicts a file folder 600 of the same character as the folder 596 shown in FIG. 36 but with two internal dividers 48 and 556 providing the two illustrated storage compartments 602 and 604 and a third storage compartment between divider 556 and rear folder panel 584. Folder 600 has three tape segments 606, 608, and 610 which, respectively join: (a) divider 48 to back folder panel 584, (b) divider 556 to divider 48, and (c) divider 48 to front folder panel 44. Folder 600 can be assembled by a machine as shown in FIG. 2 with three taping stations and two plows for flipping dividers 556 and 48 over between: (a) the first and second, and (b) second and third taping stations.

Figure 38:
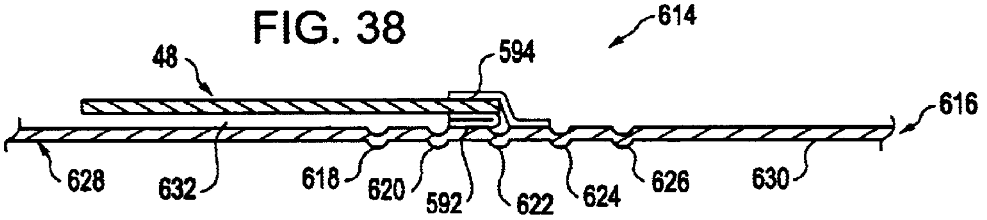
FIGS. 38 and 39 are views, like those of FIGS. 36 and 37, of expansible folders which respectively have one and two internal dividers; the feedstock folders are precreased, one-piece units rather than two, taped together panels.

Shown in FIG. 38 is a file folder 614 similar to file folder 596 but differing in that the feedstock folder 616 has five, parallel, spaced apart creases 618, 620, 622, 624, and 626 between front and back folder panels 628 and 630. By folding front and back panels 628 and 630 on different ones of these creases, the width of the material storage compartment 632 between divider 48 and front folder panel 628 may be expanded as may the companion storage compartment between the divider and back folder panel 630.

Figure 39:
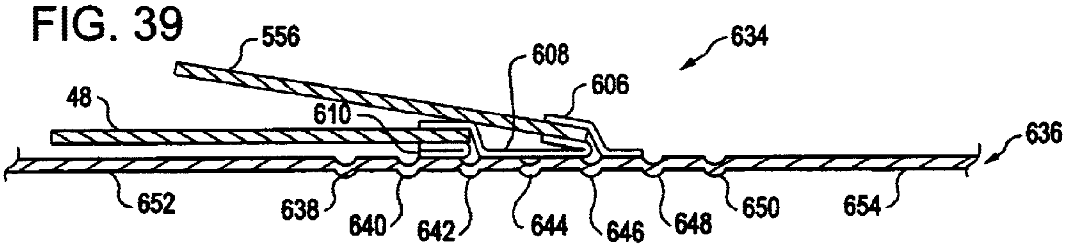

FIG. 39 depicts a file folder 634 with two dividers 556 and 48 like the folder 600 shown in FIG. 37. Folder 634 differs in that, like the folder 614 of FIG. 38, a feedstock folder 636 with multiple creases (here 638 . . . 650) located between front and back feedstock folder panels 652 and 654 is used so that the user can expand the widths of the storage compartments in the folder.

The tape segments of the FIG. 38 and FIG. 39 file folders 614 and 636 essentially duplicate those of their FIG. 36 and FIG. 37 counterparts and have accordingly been identified by the same reference characters. File folders 614 and 634 may be assembled in the same manner and on the same type of machine as file folders 596 and 600.

The invention may be embodied in other specific forms without departing from the spirit or essential characteristics thereof. For example, if expandable filing compartments are not needed or wanted, the pleating section of a machine like that identified above and the tapelike component which guides the divider of a folder into the gap between the dead plates of that section can be omitted. As a further example, additional taping stations, plow bars, and divider supply/transfer arrangements can be provided so that three, or even more, internal dividers can be installed in a file folder in accord with the principles of the present invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of manufacturing a file folder which has: (1) at least one internal divider, and (2) first and second panels taped together to form a hinge extending along a spine of the folder, said method comprising the steps of:

employing a divider/folder panel alignment mechanism to mechanically position an internal divider relative to the first file folder panel with one side of the internal divider and one side of the first file folder panel exposed and apposed marginal edges of the internal divider and the first file folder panel juxtaposed;

securing the internal divider to the first file folder panel with a first tape which extends in the same direction as the hinge of the file folder using a mechanical arrangement comprising a tape transfer mechanism having the capability of laying the first tape on the internal divider and the first file folder panel with the tape extending between and lapping onto the internal divider and the first file folder panel;

then turning the internal divider with a component manipulation mechanism to expose a second side of the internal divider; and securing the internal divider to the second file folder panel with a second tape which extends in the same direction as the hinge of the file folder using a second mechanical arrangement comprising a tape transfer mechanism having the capability of laying a second tape on the internal divider and the second file folder panel with the tape extending between and lapping onto the internal divider and the second file folder panel.

2. A method as defined in claim 1 which comprises the step of pleating the first and second tapes such that the file folder can be expanded from a minimum capacity configuration to a configuration of greater capacity.

* * * * *